(12) United States Patent
Wada et al.

(10) Patent No.: US 7,922,979 B2
(45) Date of Patent: Apr. 12, 2011

(54) SILENT DISCHARGE PLASMA APPARATUS

(75) Inventors: Noboru Wada, Tokyo (JP); Masaki Kuzumoto, Tokyo (JP); Hajime Nakatani, Tokyo (JP); Hiroyuki Igehara, Tokyo (JP); Norimitsu Esaki, Tokyo (JP); Shingo Mine, Tokyo (JP); Taichiro Tamida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 974 days.

(21) Appl. No.: 11/721,356

(22) PCT Filed: Mar. 16, 2006

(86) PCT No.: PCT/JP2006/305238
§ 371 (c)(1),
(2), (4) Date: Jun. 11, 2007

(87) PCT Pub. No.: WO2006/103945
PCT Pub. Date: Oct. 5, 2006

(65) Prior Publication Data
US 2009/0236042 A1    Sep. 24, 2009

(30) Foreign Application Priority Data

Mar. 28, 2005  (JP) ................. 2005-091426

(51) Int. Cl.
B01J 19/08 (2006.01)
(52) U.S. Cl. ............... 422/186.04; 422/186.07

(58) Field of Classification Search ............. 422/186.04, 422/186.07
See application file for complete search history.

(56) References Cited

U.S. PATENT DOCUMENTS

| | | |
|---|---|---|
| 4,690,803 A | 9/1987 | Hirth |
| 5,034,198 A | 7/1991 | Kaiga et al. |
| 5,955,038 A | 9/1999 | Gadow et al. |

FOREIGN PATENT DOCUMENTS

| | | |
|---|---|---|
| EP | 0 202 501 | 4/1986 |
| JP | 61-266304 | 11/1986 |
| JP | 62-241807 A | 10/1987 |
| JP | 2-184506 A | 7/1990 |
| JP | 6-123593 A | 5/1994 |
| JP | 7-002501 A | 1/1995 |
| JP | 8-146071 | 6/1996 |
| JP | 9-2211302 A | 8/1997 |
| JP | 11-500705 | 1/1999 |
| JP | 11-060206 A | 3/1999 |
| JP | 2001-072401 A | 3/2001 |
| WO | WO 96/30298 | 3/1996 |
| WO | WO 96/30298 A1 | 10/1996 |

Primary Examiner — Kishor Mayekar
(74) Attorney, Agent, or Firm — Leydig, Voit & Mayer, Ltd.

(57) ABSTRACT

A silent discharge plasma apparatus includes a dielectric member, a pair of electrodes opposed to each other across the dielectric member and an alternating-current source applying an alternating-current voltage between the electrodes and causing a discharge. A gas is supplied to a discharge space, where discharge occurs, and a plasma is produced. At least one of the electrodes includes a conductive power feeding thin film on the dielectric member. When the dielectric member is destroyed and an arc discharge develops between the electrodes, the power feeding thin film is eliminated or oxidized, and the arc discharge is stopped.

18 Claims, 26 Drawing Sheets

Fig.8
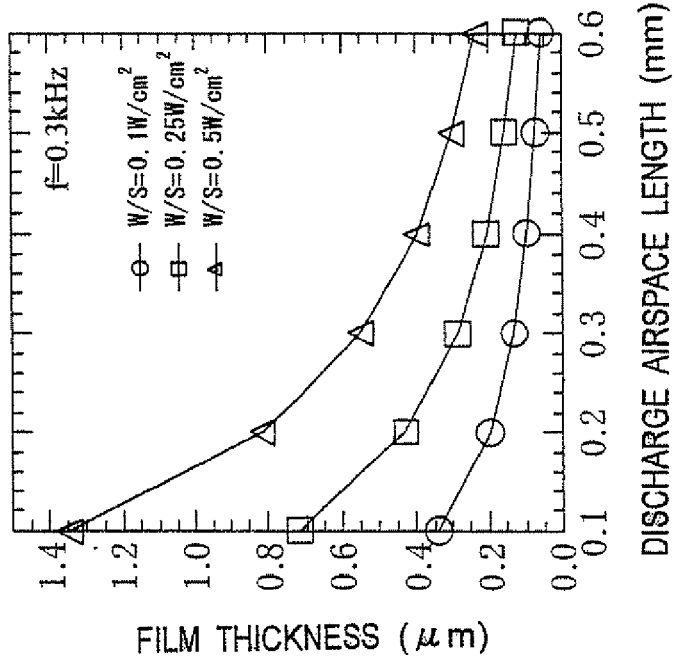
(b)
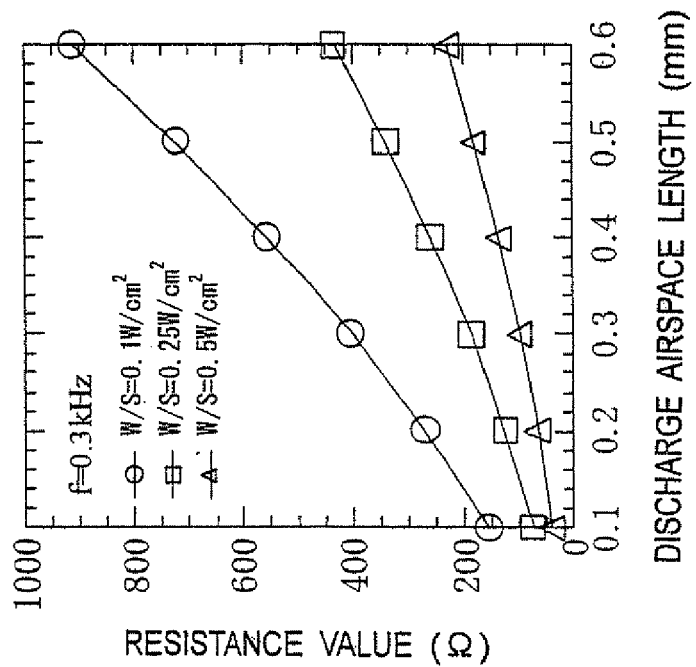
(a)

SILENT DISCHARGE PLASMA APPARATUS

TECHNICAL FIELD

The present invention relates to a silent discharge plasma apparatus, and more particularly, to a silent discharge plasma apparatus equipped with a conductive thin film electrode which permits a non-destroyed section alone to continue a safe operation.

BACKGROUND ART

One example of a conventional silent discharge plasma apparatus is a silent discharge ozone generator. A silent discharge ozone generator generally uses an electrode structure which uses a glass tube as a dielectric barrier. The presence of a dielectric barrier between metal substrates prevents a transition of discharge developing between the metal substrates to arc so that discharge repeatedly stops and develops.

However, in the event that abnormal discharge developing between the metal substrates increases a temperature or leads to application of an excessively high voltage, the voltage resistance characteristic of a dielectric member may get impaired, which could give rise to dielectric breakdown and destruction of the dielectric member, Destruction of the dielectric member short circuits the ground electrode and the high voltage electrode, stops discharge and the ozone generator, and necessitates exchange of the destroyed dielectric member. Noting this, a high voltage fuse is disposed between the electrodes of the ozone generator and a drive power source, and upon destruction of the dielectric member, the high voltage fuse is blown and the electrode which includes the destroyed section is separated from the ozone generator, which ensures continuation of the ozone generator only with the non-destroyed electrode, setting aside the electrode which includes the destroyed section (Patent Literature 1, for instance).

Patent Literature:
Japanese Patent Application Laid-Open Gazette No. H8-146071

DISCLOSURE OF INVENTION

Problems to be Solved by the Invention

There is a problem of an increased cost however, since a high voltage fuse is expensive and can not be used repeatedly.

Another problem is that the electric resistance value of the high voltage fuse itself is about a scores of $\Omega$, which is enough to create non-negligible electric and thermal losses, and the energy efficiency of the ozone generator is therefore affected.

In addition, the fuse may fail to get blown at the time of a short circuit, which is a problem concerning the safety.

In light of these problems, the present invention aims at providing a silent discharge plasma apparatus which stops supply of power to a destroyed section upon destruction of a dielectric member without using a high voltage fuse and safely continues operating only with a non-destroyed section.

Means to Solve the Problem

In short, the present invention is directed to a silent discharge plasma apparatus which includes a dielectric member, paired electrode opposed against each other across the dielectric member and an alternating-current source applying an alternating-current voltage between the electrodes and causing discharge and in which a gas is supplied to a discharge space, where discharge should occur, and plasma is accordingly created, wherein at least one of the electrodes is formed by a conductive power feeding thin film which is formed on the dielectric member, and when the dielectric member is destroyed and arc discharge develops between the electrodes, the power feeding thin film on which the arc discharge develops is eliminated or oxidized, and creation of the arc discharge is stopped.

EFFECT OF THE INVENTION

In the case of the silent discharge plasma apparatus according to the present invention, the conductive thin film electrode instantly senses a short-circuit current upon destruction of a glass tube and selectively eliminates its conductive thin film so that supply of power is stopped. This plasma apparatus is thus capable of continuously creating plasma without any electric short circuit in every section other than the self-eliminated portion of the glass tube electrode which includes the destroyed section. Further, nonuse of a high voltage fuse realizes diameter reduction of the glass tube electrodes and size reduction of the plasma apparatus and lowers a cost.

BRIEF DESCRIPTION OF DRAWINGS

FIG. 8 shows a relationship between a discharge airspace length d, a resistance value and the film thickness in the ozone generator according to the first embodiment of the present invention;

BEST MODE FOR CARRYING OUT THE INVENTION

First Embodiment

Figure 1:
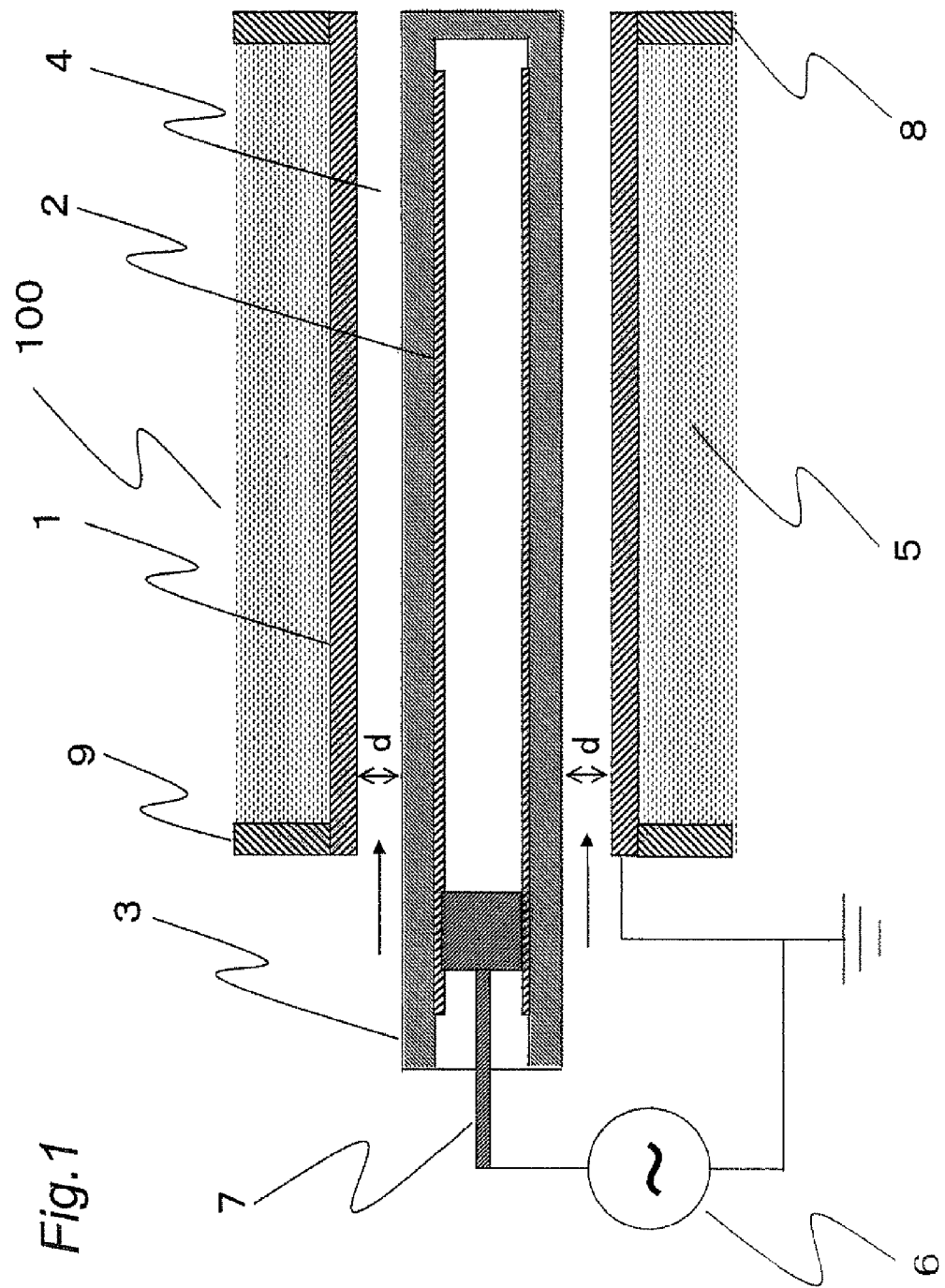
FIG. 1 is a cross sectional view of an ozone generator according to a first embodiment of the present invention.

FIG. 1 is a cross sectional view of an ozone generator according to the first embodiment. In FIG. 1, the ozone generator 100 includes a ground electrode 1 and a high voltage electrode 2 which are opposed against each other over a predetermined airspace length d. The ground electrode 1 and the high voltage electrode 2 are both coaxial cylindrical electrodes, and there is at least one dielectric member 3 between the ground electrode 1 and the high voltage electrode 2. The airspace length d will be referred to as a "discharge airspace length" and the spaced defined by the discharge airspace length will be referred to as a "discharge space 4".

One or both of the ground electrode 1 and the high voltage electrode 2 internally includes cooling water paths 5 for carrying tap water or pure water, to thereby cool down the discharge space 4.

A gas containing oxygen is introduced as a raw material gas to the discharge space 4, and as an alternating-current high voltage is applied between the ground electrode 1 and the high voltage electrode 2 via a power feeding member 7 which is connected with a drive power source 6, silent discharge plasma is created. The power feeding member 7 abuts on the high voltage electrode 2 outside the ground electrode 1.

In the plasma, collision between oxygen molecules and electrons dissociates the oxygen molecules and due to three-body collision, ozone is created. A stainless steel tube is used as the ground electrode 1 which is fixed to end plates 8 and 9, and a glass tube is used as the dielectric member 3. The glass tube which is used as the dielectric member 3 is sold by SCHOTT under the trade name "DURAN", "DURAN" is a hard glass tube which is one type of borosilicate glass, contains $SiO_2$ at the composition rate of 81%, and is excellent in chemical durability.

In the following drawings as well, the same reference symbols denote the same or corresponding sections.

The discharge airspace length d of the ozone generator 100 according to the first embodiment is 0.6 mm or shorter. Hence, as the glass tube, one whose outer diameter tolerance is at least half the discharge airspace length d or less, and considering the electric resistance value of glass, whose length is 1500 mm, thickness is 0.5 mm or thicker and whose outer diameter is 30 mm φ or smaller. The glass tube used in the present invention has a small outer diameter, and therefore, exhibits an excellent mechanical strength and gets bent in an extremely small volume along the longitudinal direction.

Used as the high voltage electrode 2 is a conductive thin film which is obtained by electroless nickel plating of the surface-treated inner surface of the glass tube. Through an appropriate surface treatment of the inner surface of the glass tube, the conductive thin film is tightly adhered to the glass tube without any clearance at a proper strength. In FIG. 1, the arrows denote the direction of gas flows, and created ozone exits at the right-hand side ends of electrode parts.

Figure 2:
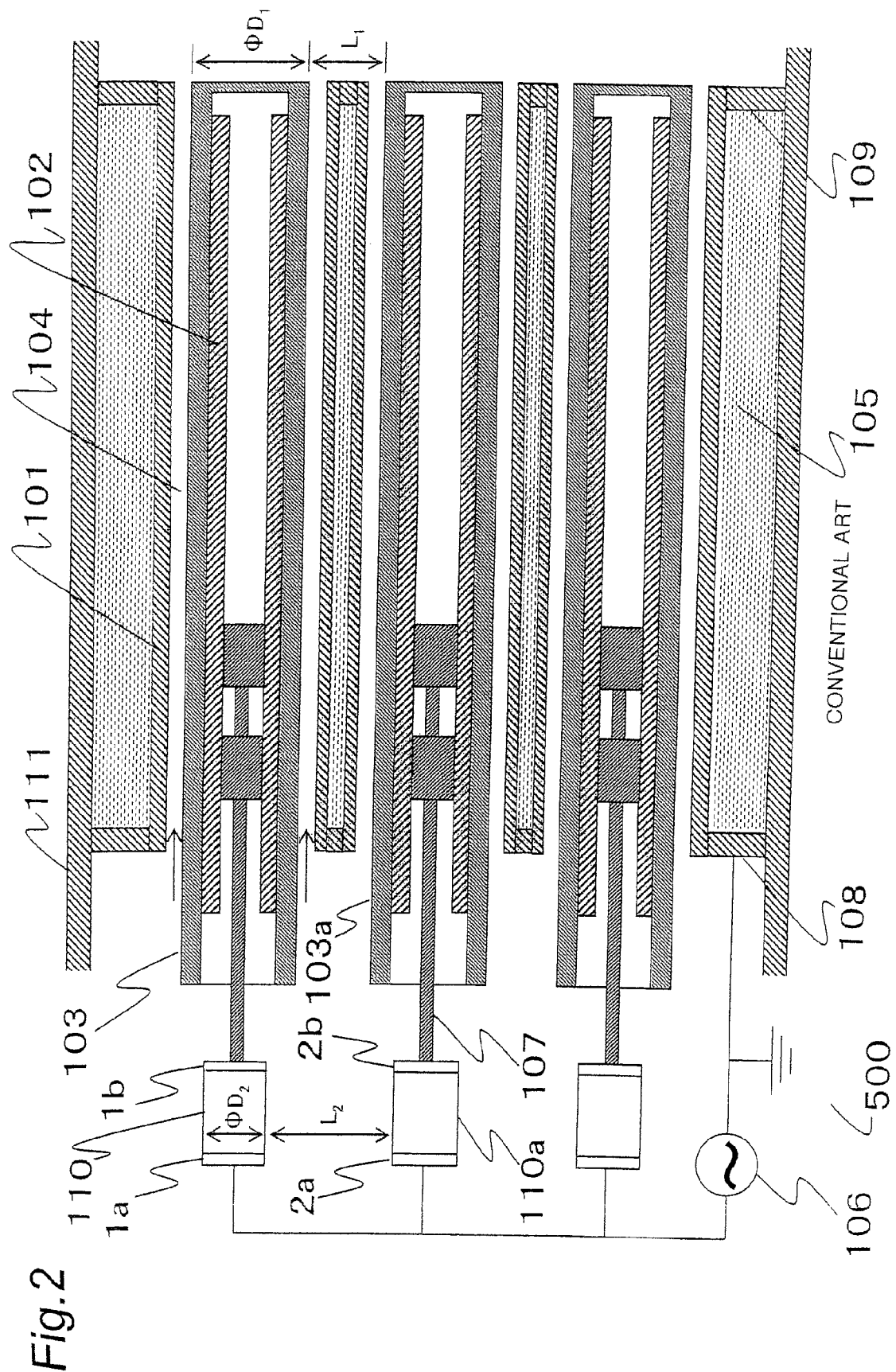
FIG. 2 is a cross sectional view of a conventional ozone generator.

For comparison, FIG. 2 is a cross sectional view of an ozone generator having a conventional structure generally denoted at 500.

As a dielectric member 103 of the ozone generator 500, a glass tube whose outer diameter is 100 mm or smaller but larger than the outer diameter of the glass tube of the ozone generator 100. On the inner surface of the glass tube, a high voltage electrode 102 is formed by thermal spraying, sputtering, vapor deposition or the like of metal which may be aluminum.

Even without a surface treatment of the inner surface of the glass tube, an extremely strong degree of adhesion is obtainable for the high voltage electrode 102. The film thickness is about a few hundred μm, for suppression of a resistance value. Meanwhile, a power feeding member 107 is in contact with the high voltage electrode 102 at several locations inside a ground electrode 101 which is fixed to end plates 108 and 109, to thereby uniformly feed power along the longitudinal direction of the high voltage electrode 102.

Figure 3:
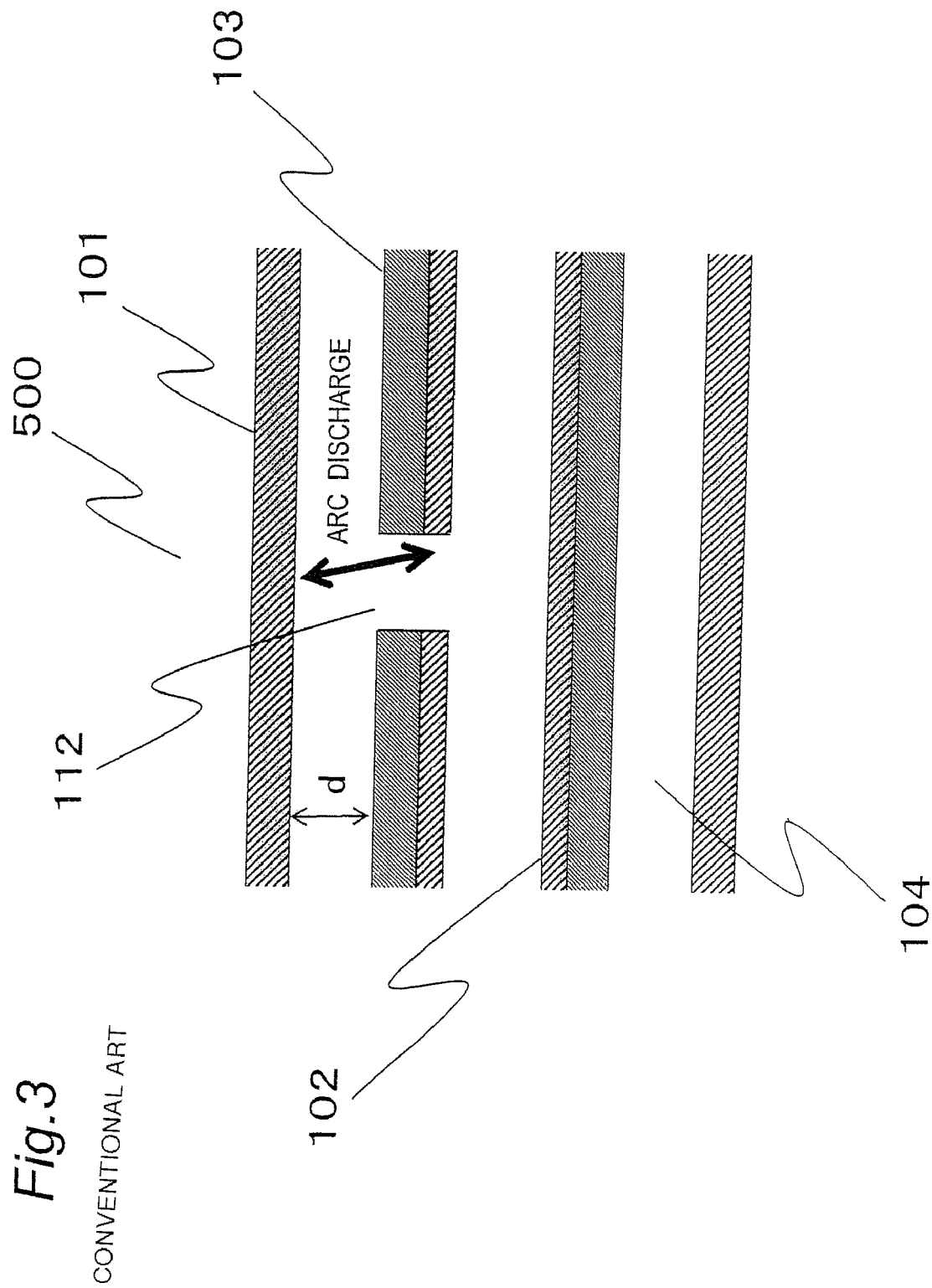
FIG. 3 is a partial cross sectional view of the conventional ozone generator.

Such a high voltage electrode 102 and such a ground electrode 101 define a discharge space 104 and develop silent discharge. The number of electrode groups is adjusted in accordance with the necessary amount of ozone to create, and the electrode groups are disposed inside a tank 111. A raw material gas containing oxygen is supplied to the discharge space 104 along the direction denoted at the arrows in FIG. 2 and discharged as ozone. Further, there is a high voltage fuse 110 between a drive power source 106 and the power feeding member 107. In the ozone generator 500, as shown in FIG. 3, upon destruction of the glass tube, arc discharge (the part denoted at the arrow) is created between the ground electrode 101 and the high voltage electrode 102 via a destroyed section 112 instantly after the destruction. As arc discharge is created, the ozone generator 500 carries a short-circuit current and silent discharge and ozone generation stop. To start thus stopped ozone generator 500 once again, the destroyed glass tube needs inevitably be replaced. For this reason, a general practice is to dispose the high voltage fuse 10 between the drive power source 106 and the power feeding member 107 and accordingly protect the ozone generator 500 against the short-circuit current which flows in upon destruction of the glass tube.

In short, since the incoming short-circuit current blows the high voltage fuse 110 connected with the destroyed glass tube and the drive power source 106 is electrically separated from the destroyed glass tube, it is possible to continue generation of ozone only with the non-destroyed glass tube without replacing the destroyed glass tube with new one. However, the glass tube which has the destroyed section can never contribute to generation of ozone.

Figure 4:
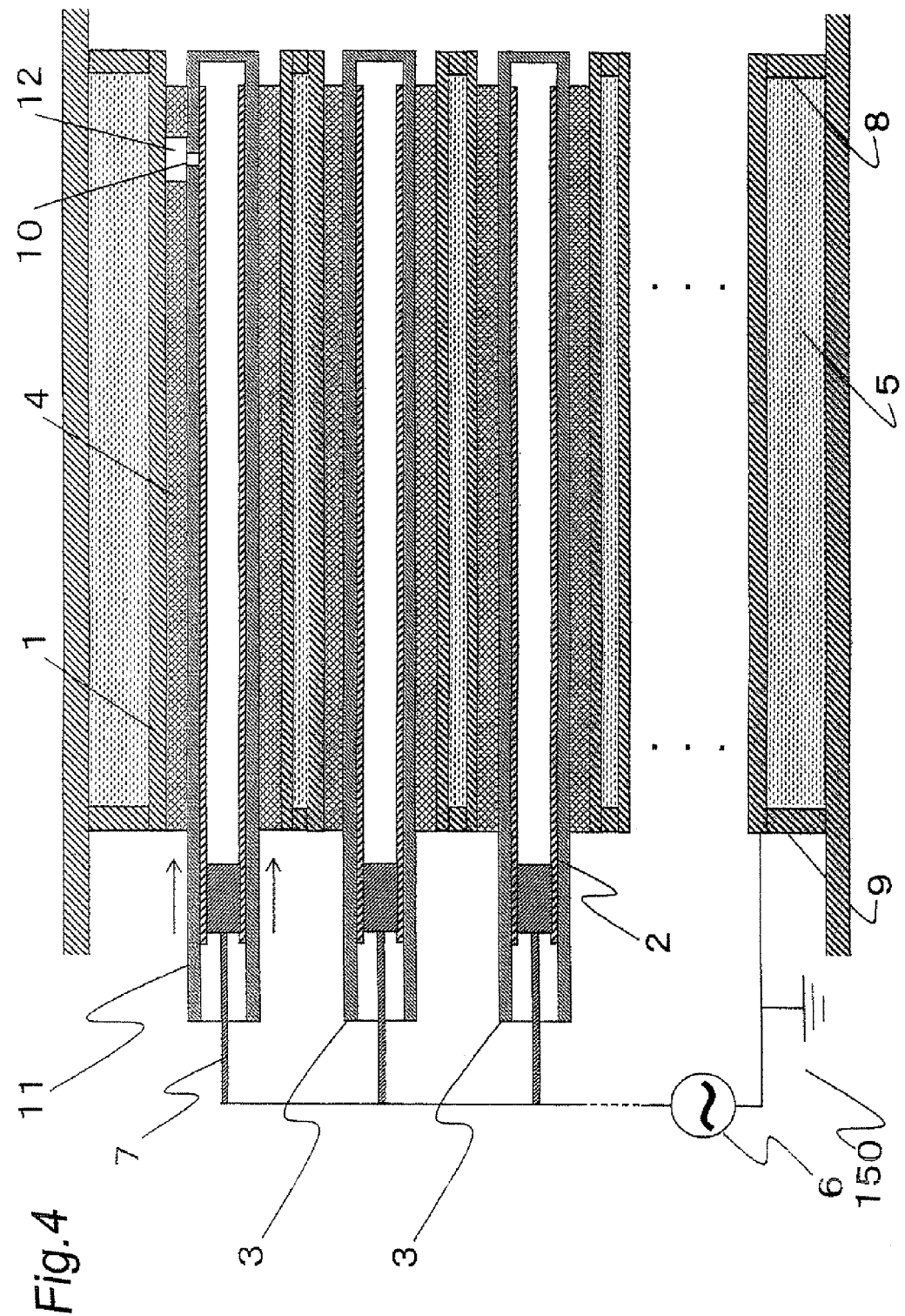
FIG. 4 is a cross sectional view of other ozone generator according to the first embodiment of the present invention.

FIG. 4 shows other ozone generator 150 according to this embodiment in which there are plural electrodes shown in FIG. 1.

Figure 5:
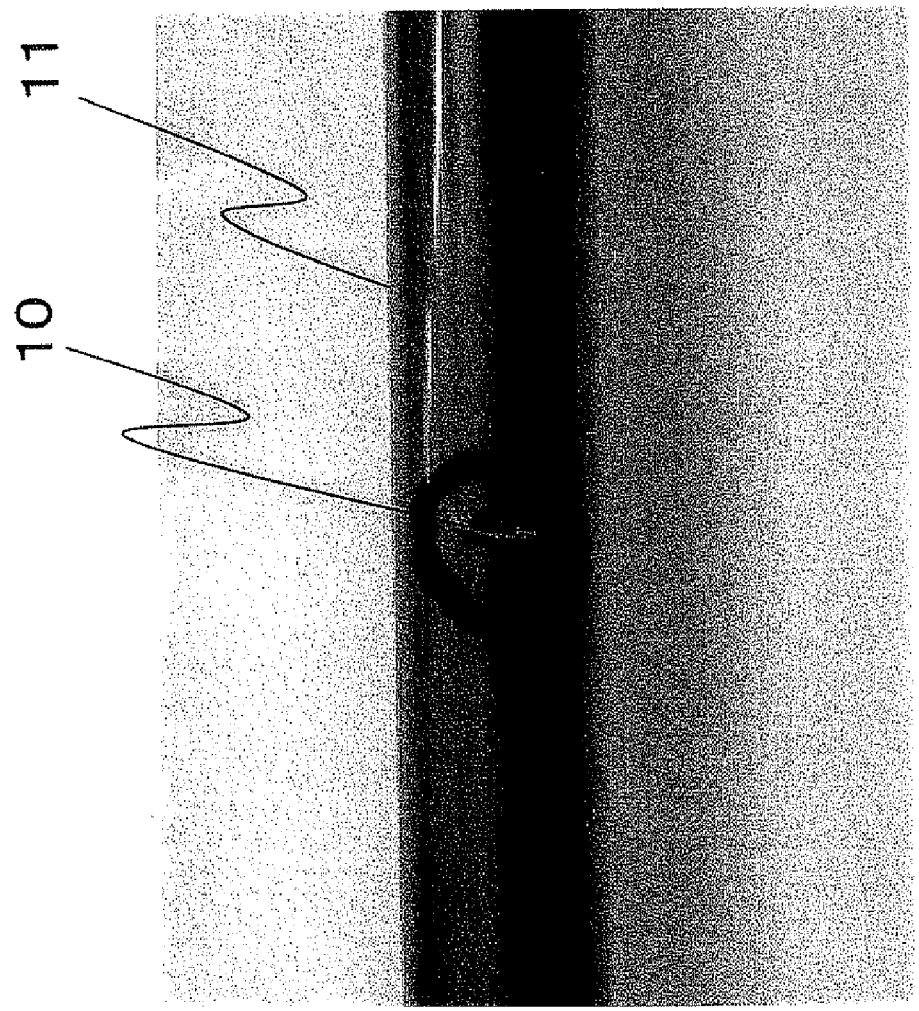
FIG. 5 is a photograph which shows the appearance of a simulated destroyed section.

In the illustrated example, with one glass tube 11 including a simulated destroyed section 10 as that shown in FIG. 5 (whose inner surface seats a high voltage electrode formed by electroless nickel plating described above) mixed among the multiple electrodes, ozone is generated. The simulated destroyed section 10 serves as a through hole whose width is about 1 mm and whose length is about 5 mm. Operating conditions for the ozone generator 150 are the crest value of the applied voltage of 5 through 12 kVp approximately and the frequency of 0.3 kHz to 10 kHz.

In the case of the conventional ozone generator, use of a glass tube including a simulated destroyed section causes electric short circuit instantly after power-on, and therefore, but for a high voltage fuse between a drive power source and a high voltage electrode, the conventional ozone generator can not keep operating only with glass tubes which includes no destroyed section. In contrast, in the case of the ozone generator 150 according to the present invention, despite the existence of the clearly destroyed section 10, no electric short circuit occurred and the ozone generator 150 was able to continue discharge and generation of ozone in all glass tubes including the glass tube 11 including the destroyed section 10 (In FIG. 4, the shaded portion within the discharge space 4 denotes a portion generating ozone without any short circuit.).

Figure 6:
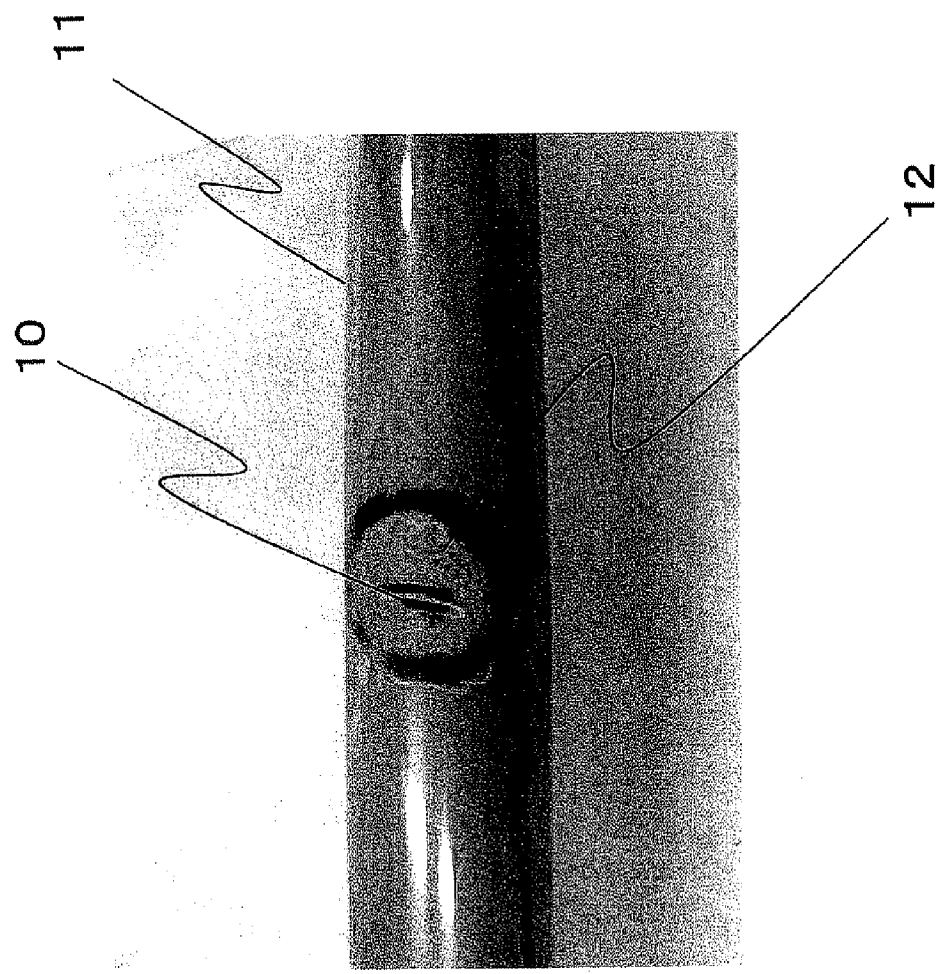
FIG. 6 is a photograph which shows the appearance of a simulated destroyed section.

FIG. 6 is a photograph which shows the destroyed section 10 as it is after continuation of discharge for a few minutes. One can see in FIG. 6 that only the high voltage electrode over approximately 10 mm around the destroyed section 10 has exfoliated and disappeared (Denoted at the reference number 12 is the exfoliated and disappeared section.).

In short, upon destruction of the glass tube in the ozone generator 150 according to the present invention, although arc discharge develops instantly via the destroyed section as in the conventional ozone generator, the moment the arc discharge develops, due to a thermal influence based on an excessive current (short-circuit current) or the like, the high voltage electrode around the destroyed section formed by the conductive thin film is eliminated as it exfoliates, evaporates or gets sublimated. That is, the high voltage electrode itself instantly detects the arc discharge induced short-circuit current, and eliminates itself in the area which corresponds to a creeping distance over which the arc discharge is considered to approximately stop. This function of selectively stopping discharge only around the destroyed section is a similar function to that realized by a high voltage fuse, and therefore, the high voltage electrode according to the present invention is considered to be equivalent to parallel connection of an unlimited number of high voltage fuses.

Further, a similar effect was confirmed even despite changes of the location, the shape and the size of the destroyed section 10. In addition, when the ozone generator operated under an abnormal operating condition without forming a simulated destroyed section, while a destroyed section shaped like a through hole of about Φ 1 mm was created as illustrated in FIG. 6, the glass tube did not break even though the glass tube was intentionally destroyed, and owing to self-elimination of the high voltage electrode, discharge only around the destroyed section was selectively stopped.

Upon destruction of the glass tube, an ozone generator using a conventional high voltage fuse carries a short-circuit current via the destroyed section, and a high voltage fuse gets blown away. A glass tube including the destroyed section due to blowing of the high voltage fuse is separated from a drive power source and silent discharge stops. This reduces the amount of generated ozone by an amount corresponding to the number of destroyed glass tubes. In contrast, in the case of the ozone generator according to the present invention, as the high voltage electrode only around the destroyed section disappears, which makes it possible to continue application of the high voltage upon the glass tube including the destroyed section and stop the silent discharge only around the destroyed section. Hence, the amount of generated ozone rarely drops.

The effect of self-elimination of the high voltage electrodes is affected by the adherence power of the material and the film thickness of the high voltage electrodes to the glass tubes. Since the high voltage electrode must disappear instantly due to arc discharge upon destruction, an excessive film thickness and adherence power are unnecessary.

Figure 7:
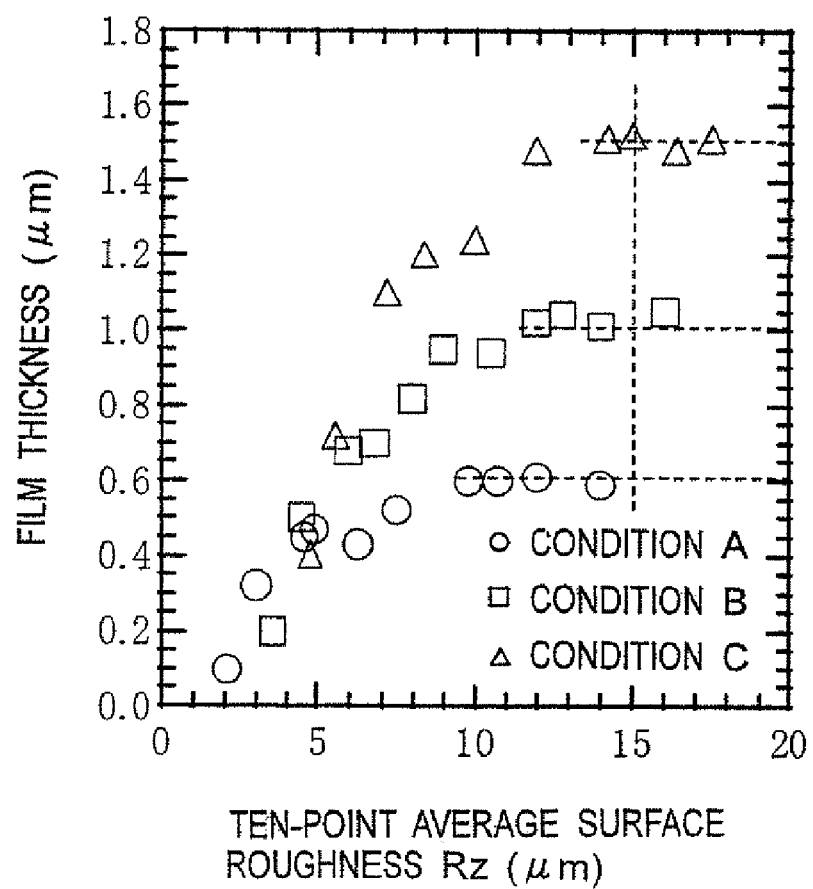
FIG. 7 shows a relationship between a ten-point average surface roughness Rz on the inner surface of a glass tube and the film thickness of a high voltage electrode in the ozone generator according to the first embodiment of the present invention.

FIG. 7 shows a relationship between a ten-point average surface roughness Rz on the inner surface of the glass tube and the film thickness of the high voltage electrode in the ozone generator according to the present invention. A condition for electroless nickel plating (condition A) was constant. In FIG. 7, measured along the vertical axis is the film thickness (μm) of the high voltage electrode while measured along the horizontal axis is the ten-point average surface roughness Rz (μm) on the inner surface of the glass tube as it is before execution of electroless nickel plating.

It is impossible to form the high voltage electrode with proper adherence power on a base material like glass whose surface roughness is extremely small (Rz=0.1 μm approximately), and therefore, a general practice is to treat the surface of the base material and accordingly provide the anchor effect. When the degree of adhesion is too small, partial exfoliation occurs or exfoliation occurs when the power feeding member is disposed. Since the magnitude of thus provided anchor effect provided changes depending upon the material, the shape and the like of the base material and the material of the high voltage electrode, it is necessary to determine the optimal values of the film thickness of the plating and the surface roughness of the glass tube based on the result shown in FIG. 7. One can see in FIG. 7 that as Rz increases, that is, as the irregularity of the inner surface of the glass tube intensifies, the film thickness of thus formed high voltage electrode tends to increase.

The film thickness of thus formed high voltage electrode which can be formed is about 0.6 μm without almost any change when Rz is 10 μm or higher.

As Rz exceeds 12 μm, the film thickness rarely changes, and further, partial exfoliation occurs.

From the result above, one can see that it is possible to form a high voltage electrode which exhibits proper adherence strength to the glass tube according to the present invention when Rz is 12 μm or less. As Rz exceeds 12 μm, convex sections of the created irregularity becomes subjected to the surface treatment, and hence, flat sections expand and the anchor effect becomes less influential. Further, in the event that a thin film is to be formed on the inner surface of a tube as in the present invention, at or beyond a certain film thickness, the residual stress of the thin film of the high voltage electrode becomes considerably large, and the film thickness of the high voltage electrode starts to saturate relative to the surface roughness of the glass tube. Hence, an increase of the film thickness is not expected, but rather, partial exfoliation occurs.

It was confirmed that all high voltage electrodes sufficiently exhibited their self-elimination effect when Rz the inner surfaces of thus formed glass tubes was 12 µm.

It was also confirmed however that when Rz was 12 µm or more, due to a lower adherence strength of the plated membranes, external energy attributable to arc discharge triggers the self-elimination effect and exfoliation other than at a destroyed section. Hence, when the surface roughness Rz of the inner surfaces of the glass tubes is 12 µm or less, it is possible to achieve a selective self-elimination effect only at a destroyed section.

In the event that the concentration of a plating solution, the temperature of the plating solution and the plating time are adjusted and residual stress which suppresses thickening of plating is mitigated (conditions B and C), the area where it is possible to uniformly and stably form high voltage electrodes as it is possible under the condition A is an area wherein Rz is 14 µm or less and the film thickness is 1.0 µm or thinner under the condition B but an area wherein Rz is 15 µm or less and the film thickness is 1.5 µm or thinner under the condition C.

The changes from the condition A are the temperature of the plating solution and the plating time as for the condition B, and the concentration of the plating solution and the plating time as for the condition C. It was confirmed that all high voltage electrodes sufficiently exhibited the self-elimination effect under the both conditions.

While the self-elimination effect of high voltage electrodes upon destruction of glass tubes is considered to be influenced by the film thickness of the high voltage electrodes, if the film thickness is excessively thin, the resistance value of the high voltage electrodes so that a resistance-induced caloric loss is created. In a conventional ozone generator, for the purpose of suppressing a calorific loss attributable to the resistance value of high voltage electrodes, a conductive layer having an extremely thick film thickness is used as high voltage electrodes.

In contrast, since a calorific loss attributable to the high voltage electrodes is 1% or less of discharge power relevant to generation of ozone according to the present invention, where the length of the glass tubes is about 1500 mm as in this embodiment, considering uniform feeding of power and a calorific loss within the same high voltage electrode, the resistance value along the longitudinal direction of the high voltage electrodes is preferably 1000Ω or lower. This resistance value changes in accordance with the length of the high voltage electrodes, of course.

The electric resistivity of the membrane formed by electroless nickel plating used in this embodiment is on the order of $10^{-6}$ Ω·m which is approximately two digits higher than that of bulk nickel ($10^{-8}$ Ω·m).

FIG. 8(a) shows relationships between the discharge airspace length d of the ozone generator and the resistance value of the high voltage electrodes with which a calorific loss at the high voltage electrodes becomes 1% of discharge power. In FIG. 8(a), the vertical axis denotes the resistance value of the high voltage electrodes (Ω) while the horizontal axis denotes the discharge airspace length d (mm), and the relationships as they are where the discharge power density of the ozone generator is 0.1 W/cm$^2$, 0.25 W/cm$^2$ and 0.5 W/cm$^2$ are shown. The operation frequency is 0.3 kHz.

FIG. 8(b) shows relationships between the film thickness (µm) of the high voltage electrodes and the discharge airspace length d (mm) under the same conditions as those for FIG. 8(a). One can see in FIG. 8(b) that in the operation area of the ozone generator according to the present invention, the film thickness of the high voltage electrodes is effective when it is 0.05 µm or thicker. In short, one can see that in the event that the discharge airspace length d is 0.6 mm or shorter, the film thickness of the high voltage electrodes may be 0.05 µm or thicker to ensure a calorific loss of 1% or less of discharge power.

With respect to the operation frequency of 0.3 through 10 kHz, as a result of confirmation of the self-elimination effect upon destruction of glass tubes where the film thickness of the high voltage electrodes was from 0.05 µm to 1.5 µm, it was ascertained that the self-elimination effect was obtained without fail at all high voltage electrodes.

The operation frequency is preferably low considering the reliability of the self-elimination effect, and from a standpoint of reduction of the crest value of the voltage applied upon the ozone generator, it is more preferable that the operation frequency is from 0.8 through 6 kHz.

As described above, the film thickness of a high voltage electrode formed by electroless nickel plating can be determined considering the surface roughness of glass tubes serving as the base material and a calorific loss, and further optimized in light of a cost, etc.

In consequence, it was found that the operating conditions for the ozone generator according to the present invention are preferably the ten-point average surface roughness of the based material forming the high voltage electrodes of 15 µm or less and the film thickness of the high voltage electrodes of 0.05 µm or thicker in order to make the high voltage electrodes exhibit a sufficient self-elimination effect upon destruction of the glass tubes.

Figure 9:
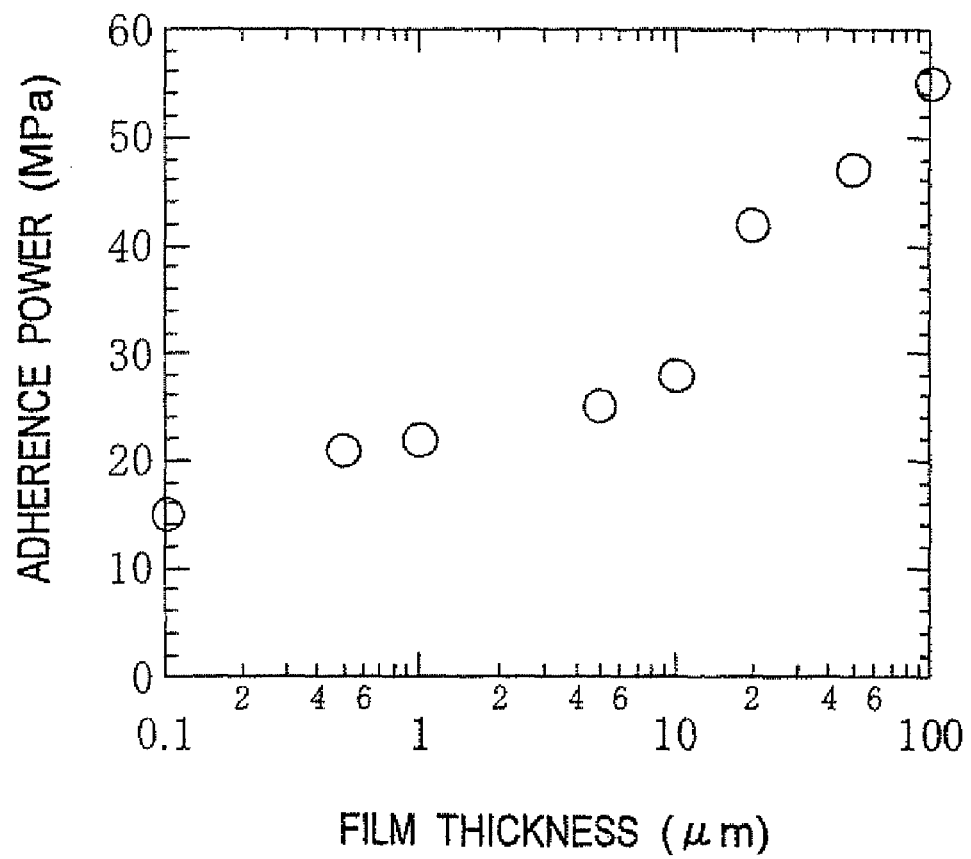
FIG. 9 shows a relationship between the film thickness and adherence power in the ozone generator according to the first embodiment of the present invention.

Other than electroless nickel plating, electrolytic plating, thermal spraying, vapor deposition, sputtering or coating with a conductive paint may be used to form the high voltage electrodes. While a surface treatment of the inner surfaces of the glass tubes is not always necessary when the high voltage electrodes are formed by thermal spraying, vapor deposition, sputtering or coating with a paint, execution of a similar surface treatment to electroless nickel plating is preferable where electrolytic plating is used. FIG. 9 shows a relationship between the film thickness of various high voltage electrodes which are formed by such methods and adherence power with glass tubes. In FIG. 9, the vertical axis denotes the adherence power (MPa) achieved during a tensile test and the horizontal axis denotes the film thickness (µm) of the high voltage electrodes. One can see in FIG. 9 that the adherence power increases when the film thickness of high voltage electrodes exceeds 10 µm. Further, on all electrodes shown in FIG. 9, a test for confirming a similar self-elimination effect of high voltage electrodes to that shown in FIG. 6 was conducted, and it was confirmed that the self-elimination effect was realized in all high voltage electrodes.

Meanwhile, since the adherence power with the glass tubes exceeds 50 MPa as the film thickness exceeds 100 µm although not shown and thick film electrodes exhibiting strong adherence power are obtained, a sufficient self-elimination effect is not attained at the high voltage electrodes, arc discharge continues, and short circuit occurs.

That is, the self-elimination effect of high voltage electrodes according to the present invention is realized in such high voltage electrodes whose film thickness is 100 µm or thinner. Hence, also in light of where high voltage electrodes are formed by electroless nickel plating, the film thickness of high voltage electrodes needs be 0.05 through 100 µm to attain the self-elimination effect.

However, since high voltage electrodes will not pose any problem as long as they exhibit appropriate adherence power just to the extent not causing natural detachment according to the present invention, it is further desirable to form high voltage electrodes in the film thickness of 0.05 through 10 μm which does not necessitate an increase of the adherence power beyond the necessity.

In a destroyed glass tube section, a high voltage electrode sensing a short-circuit current maintains a creeping distance which is enough to instantaneously almost stop arc discharge and then disappears. However, creeping discharge to the ground electrode from the end of the high voltage electrode via the glass tube, the end of the high voltage electrode could deteriorate and elimination could be facilitated despite the stopped arc discharge. It is therefore necessary to grasp an optimal creeping distance between the end of the high voltage electrode and the ground electrode.

Figure 10:
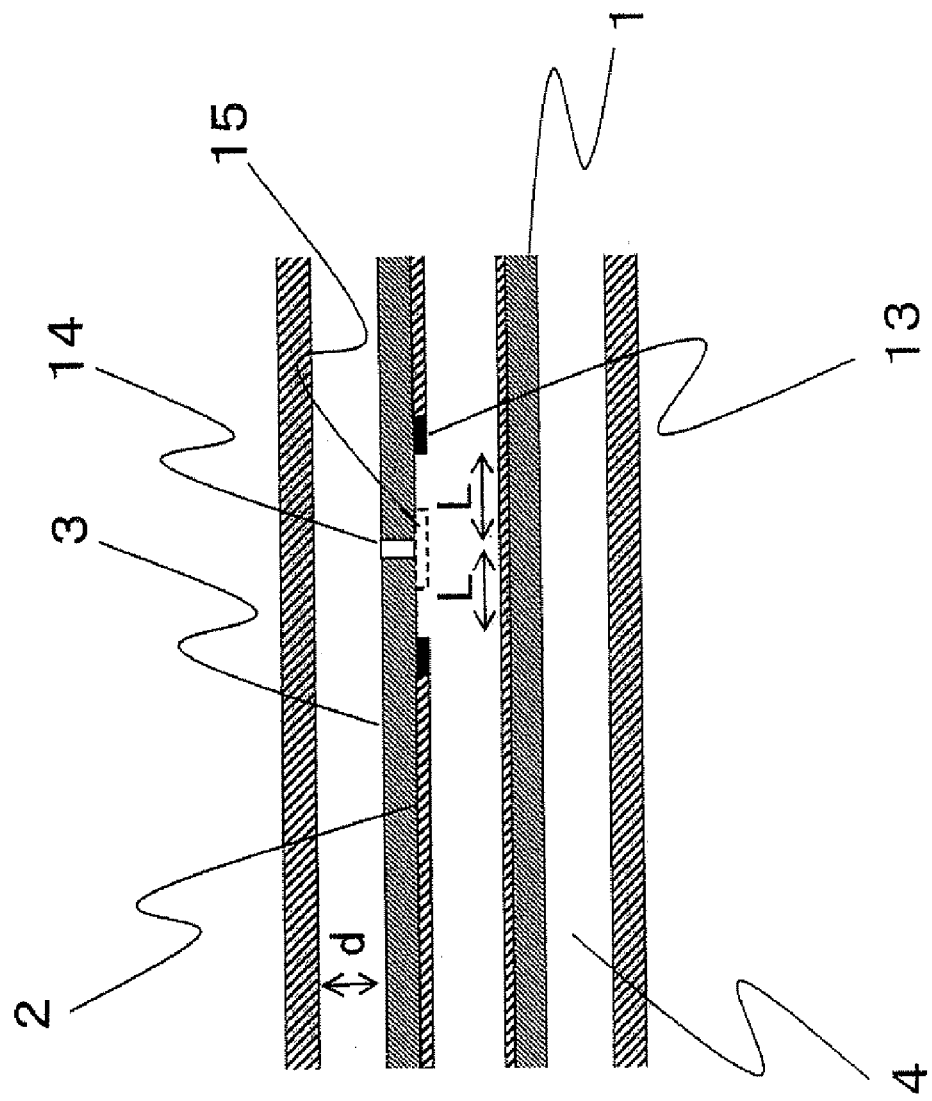
FIG. 10 is a partial cross sectional view of the ozone generator according to the first embodiment of the present invention.

With respect to the ozone generator 100 according to the present invention, it is considered that the creeping distance L between the high voltage electrode 2 and the ground electrode 1 needs be at least 10 mm. As shown in FIG. 10, in the event that a destroyed section 14 is created in the dielectric member 3 which is a glass tube, a section over about 10 mm around the destroyed section 14 eliminates itself as an initially eliminated section 15 under the thermal influence attributable to instantaneous arc discharge. As this condition is maintained and generation of ozone is continued, owing to creeping discharge from the end of the high voltage electrode, advancement of the self-eliminated section may sometimes be confirmed to occur approximately over the distance L from the destroyed section 14. The distance L is about 5 through 10 mm.

Despite this, advancement of thus eliminated section automatically stops as an oxide layer 13 is formed at the end of the high voltage electrode, and the eliminated section stops advancing. The oxide layer 13 functions as a field reducing layer exhibiting semi conductivity over about the width of 2 mm, not as an insulator, and eventually stops creeping discharge.

Hence, it is necessary to consider a possibility that a self-eliminated section of a high voltage electrode could continue expanding because of creeping discharge after instantaneous arc discharge until it has reached, including the initially eliminated section 15, the creeping distance L of about 10 mm toward the both side along the longitudinal direction, that is, until the self-eliminated range has become about 20 mm.

Figure 11:
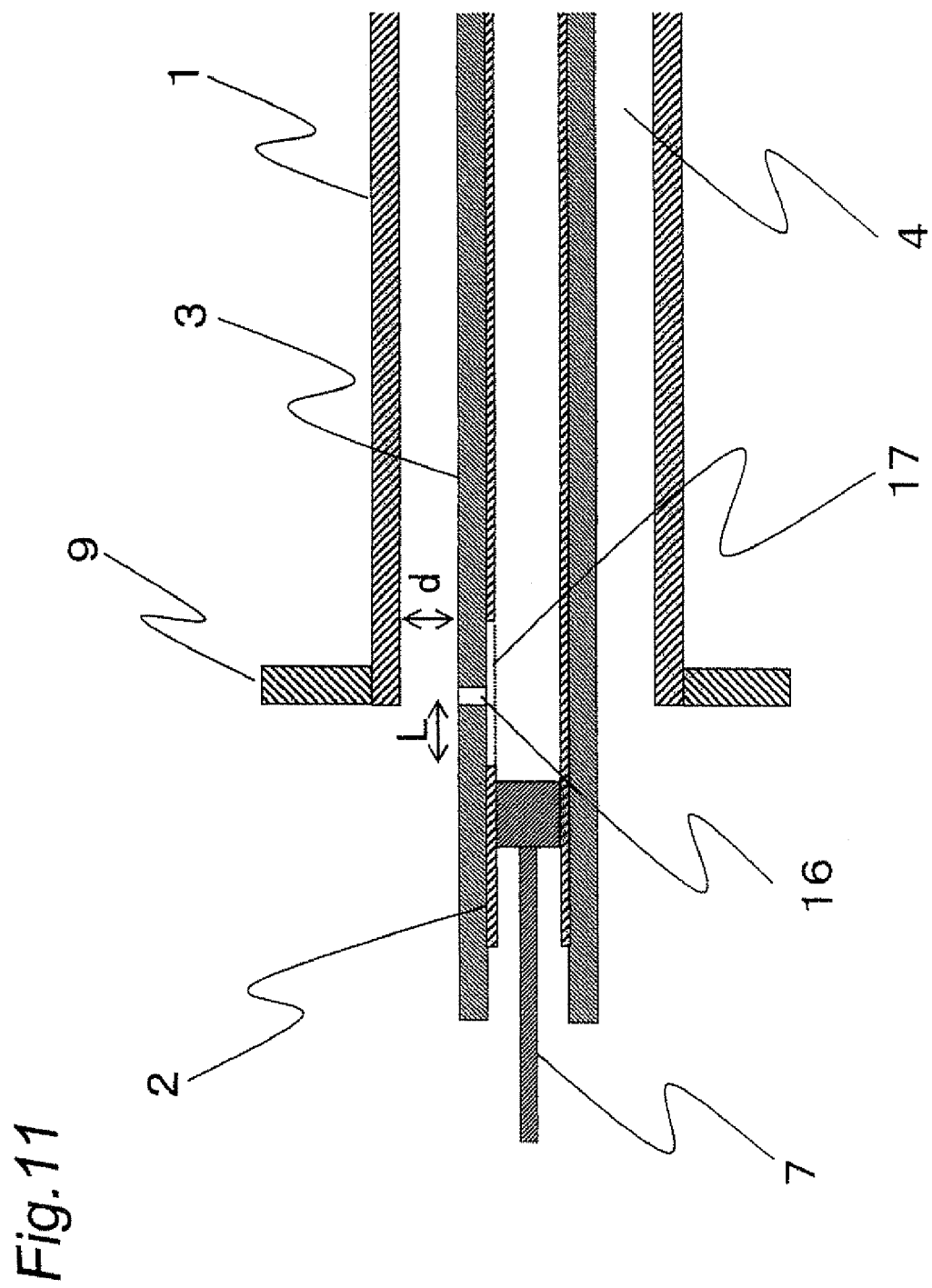
FIG. 11 is a partial cross sectional view of the ozone generator according to the first embodiment of the present invention.
Figure 12:
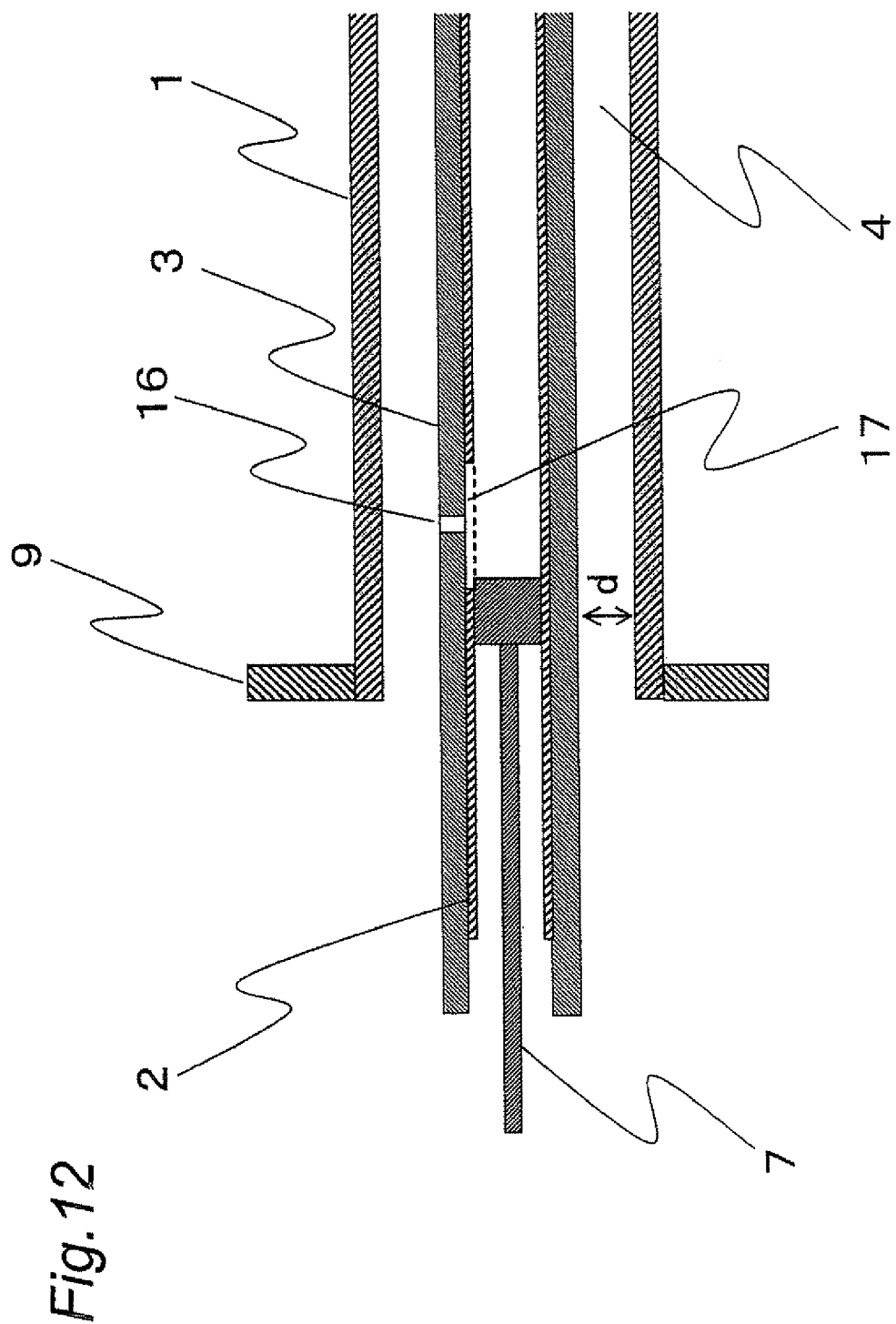
FIG. 12 is a partial cross sectional view of the ozone generator according to the first embodiment of the present invention.

FIGS. 11 and 12 are cross sectional views which show where the high-voltage power feeding member is disposed in the ozone generator 100 according to the present invention. According to the present invention, as shown in FIG. 11, it is desirable that the power feeding member 7 contacts the high voltage electrode 2 outside the ground electrode 1 and does not exist inside the ground electrode 1. FIG. 12 shows an instance that the power feeding member 7 contacts the high voltage electrode 2 inside the ground electrode 1, the glass tube is damaged near the location of the contact of the power feeding member 7 and a destroyed section 16 is formed. The self-eliminated section 17 of the high voltage electrode 2 may expand over about 20 mm, and therefore, the self-eliminated section 17 advances even to the location of the contact of the power feeding member 7 in the example shown in FIG. 12. In this case, despite elimination of the high voltage electrode 2, a discharge path is created directly to the ground electrode 1 from the power feeding member 7 which does not eliminate itself, arc discharge develops and the ozone generator short circuits.

Hence, as shown in FIG. 11, in the event that the power feeding member 7 contacts the high voltage electrode 2 outside the ground electrode 1, that is, outside the discharge space, self-elimination of the high voltage electrode 2 is effective. To be more specific, as the glass tube is damaged at the end of the ground electrode 1 and the destroyed section 16 and the self-eliminated section 17 of the high voltage electrode are created, the power feeding member 7 is preferably disposed at the creeping distance l of at least 10 mm or longer from the end of the ground electrode 1. As the power feeding member 7 contacts in this manner, it is possible to sense destruction of the glass tubes at any position within the discharge space without giving rise to short circuit.

It is often on the ozone output side (which is the right-hand side end of the ground electrode in FIG. 11) that destruction of the glass tubes actually occurs. Therefore, contact of the power feeding member 7 with the high voltage electrode 2 inside the ground electrode 1 may not cause a problem when the power feeding member 7 is disposed on the ozone input side (which is the left-hand side end of the ground electrode in FIG. 11). The sufficient distance maintained to the contact position of the power feeding member from the downstream-most side which is where a destroyed section is created generally maintains normal ozone generation in other section despite destruction of the glass tube as self-elimination occurs only in a portion on the ozone output side. Due to this, the amount of generated ozone rarely decreases, short circuit does not occur, and generation of ozone is continued safely.

A conventional ozone generator uses dielectric members (glass tubes) whose diameter is about 80 mm. Since the amount of generated ozone is proportional to the number of glass tube electrodes, in order to increase the amount of generated ozone, the number of glass tube electrodes needs be greater and the diameter of a tank of the ozone generator which houses the glass tubes therefore needs be large. Noting this, if the diameter of the glass tubes is reduced and the degree of integration of the glass tube electrodes in the tank of the ozone generator is increased, it is possible to reduce the diameter of the tank of the ozone generator while maintaining the amount of generated ozone.

When the diameter of the glass tubes is reduced however, it is impossible to dispose high voltage fuses. This is because of the increased number of glass tube and degree of integration, which makes it impossible to maintain an insulating distance between the adjacent high voltage fuses. For instance, as shown in FIG. 2, assuming that the diameter of the glass tubes 103 is $\phi D_1$, the distance between the adjacent glass tubes is $L_1$, the diameter of the high voltage fuses 110 is $\phi D_2$ and the distance between the adjacent high voltage fuses is $L_2$, the discharge size within the ozone generator is proportional to the number of the glass tubes, the effective discharge length and the outer diameter of the glass tubes. Where the diameter of the tank of the ozone generator is the same, if the diameter $\phi D_1$ of the glass tubes 103 is halved for instance, the number of the glass tubes which can be integrated inside the tank 111 approximately quadruples and the discharge area approximately doubles. In short, it is possible to generate double the amount of ozone in the ozone generator having the same tank diameter. Reduction of the diameter of the glass tubes is thus extremely effective in providing a compact ozone generator.

In the event that one high voltage fuse is to be disposed per glass tube, reduction of the diameter of the glass tubes makes it impossible to insulate between the adjacent high voltage fuses. In a conventional ozone generator, $\phi D_1$ is 80 mm, $L_1$ is 5 mm and $\phi D_2$ is 20 mm for example, and therefore, $L_2$ is $\phi D_1 + L_1 - \phi D_2 = 65$ mm. If the glass tube 103 is destroyed in the form of a through hole at a certain position, the terminal 1b of the high voltage fuse 110 changes to the ground potential. Since the crest value of an applied voltage is around 10 kV in an ordinary ozone generator, a high voltage is applied upon the terminal 2b of the neighboring high voltage fuse 110a and a voltage as high as about 10 kV is therefore applied between the terminal 1b and the terminal 2b. When an ozone generator which uses oxygen as a raw material is supposed to operate with the gas pressure of about 0.1 MPa (G), it is necessary that the insulating distance $L_2$ is 15 mm or longer so as to prevent dielectric breakdown at a voltage of about 10 kV. This insulating distance is determined considering deterioration of the insulating capability of the high voltage fuses due to an temperature increase and the accuracy of the arrangement of the high voltage fuses. In the example according to the conventional technique, $L_2$ is 65 mm and it is therefore possible to maintain insulation. Meanwhile, to ensure $L_2$ of 15 mm or longer, the diameter of the glass tubes needs be 30 mm or lager. Although reduction of the diameter of the high voltage fuses further reduces the diameter of the glass tubes, from a standpoint of design of the high voltage fuses, the outer diameter of 20 mm has heretofore been a technical limit. In short, it is technically difficult to reduce the diameter $\phi D_1$ of the glass tubes down to 30 mm or smaller as long as the high voltage fuses are disposed while securing protection against short circuit, and protection against short circuit by means of the high voltage fuses is a restriction against an attempt to reduce the size of an ozone generator.

As for the glass tubes used in the present invention, it is not necessary to dispose high voltage fuses or consider an insulating distance between adjacent high voltage fuses. It is therefore possible to reduce the outer diameter of the glass tubes down to $\phi$ 30 mm or smaller.

From a perspective of ensuring the voltage resistance capability, the mechanical strength and the accuracy of the discharge airspace length to use, the outer diameter of the glass tubes is set to $\phi$ 30 mm or smaller and the thickness of the glass tubes is set to 0.5 mm or thicker. Such glass tubes are extremely superior in mechanical strength and thermal strength (heat resistance), and therefore, will not "break", i.e., fall into pieces even when damaged in terms of voltage resistance capability and destroyed, but instead stay partially destroyed in the shape of a through hole as described in relation to the embodiment. Further, even despite an excessive heat stress due to instantaneous arc discharge immediately before self-elimination of the high voltage electrode, "breaking" will not occur either.

A conventional ozone generator including high voltage fuses, upon glass tube destruction, can keep operating only with glass tubes which have not been destroyed although the relevant high voltage fuse blows. However, as a pressure drop will be smaller if a raw material gas flows to a discharge space via a destroyed section from inside the destroyed glass tube than where it flows through the discharge space, a concentrated flow of the raw material gas to the destroyed glass tube may reduce the amount of the raw material gas to the discharge space which houses the non-destroyed glass tubes and reduce the amount of generated ozone.

In contrast, in the case of the glass tubes used in the present invention, since destruction occurs in the same form of a very small through hole, the raw material gas does not flow in a great amount into the glass tube which has the destroyed section, and the amount of generated ozone rarely decrease because of imbalanced flows of the raw material gas.

On the other hand, when the outer diameter exceeds $\phi$ 30 mm, the outer diameter tolerance of the glass tubes can not ensure the accuracy of the discharge airspace length, and in addition, the glass tubes may be "broken" and destroyed, which is not desirable in implementation of the present invention.

However, if such a glass substrate does not get "broken" but destroyed in the shape of a through hole, owing to the self-elimination effect of the associated high voltage electrode, it is possible to continue normal ozone generation other than at the destroyed section and suppress a decrease of the amount of generated ozone.

"DURAN" used in the present invention is a glass tube (which contains $SiO_2$ at the composition rate of about 80% or higher and has the upper temperature limit of 250° C.) which corresponds to the first grade of hard glass tube according to the JIS standard. A glass tube which corresponds to the second grade (which contains $SiO_2$ at the composition rate of about 80% or lower and has the upper temperature limit of 180° C.) however is inferior to the first grade in terms of mechanical strength and thermal strength, and therefore, not preferable as it may get "broken" and destroyed like a glass tube described above of beyond $\phi$ 30 mm. Glass corresponding to the first grade of hard glass includes, in addition to borosilicate glass, quartz glass and high silicate glass which attain a similar effect to that according to the embodiment. In addition, use aluminosilicate glass (whose $SiO_2$ content is 60% or higher) which has an extremely high softening point and is excellent in heat resistance although containing $SiO_2$ at the composition rate of about 80% or lower attains a similar effect to that according to the embodiment.

Self-elimination of high voltage electrodes is considered to occur due to a heat input owing to arc discharge which develops instantaneous short circuit. Noting this, a physical property value which serves as a reference in choosing glass tubes in relation to a heat input may be a coefficient of thermal expansion (linear coefficient of expansion). The coefficient of thermal expansion of "DURAN" used in the embodiment (20° C.-300° C.) is $3.3 \times 10^{-6}$ $K^{-1}$. Simulated destroyed sections were created in plural other glass tubes having different coefficients of thermal expansion in a similar fashion to that illustrated in FIG. 6, and the self-elimination effect of high voltage electrodes was confirmed in a test. Table 1 shows the result.

Included in Table 1 are the film thickness of the high voltage electrodes associated with the respective glass tubes, the coefficients of thermal expansion, whether the self-elimination effect was observed, and the conditions of the glass tubes after this confirmation test. According to Table 1, self-elimination of the high voltage electrodes associated with all glass tubes is confirmed, which means a similar effect to that according to the embodiment. However, the glass tube whose coefficient of thermal expansion is $9.8 \times 10^{-6}$ $K^{-1}$ cracked despite the confirmed self-elimination of the high voltage electrode. In addition, the glass tube whose coefficient of thermal expansion is $10.8 \times 10^{-6}$ $K^{-1}$ was "broken". This is considered to be because increased coefficients of thermal expansion made it impossible to these glass tubes to maintain their shapes against a heat input owing to instantaneous arc discharge.

If a glass tube gets broken, despite self-elimination of a high voltage electrode and continued operation without short circuit of an ozone generator as the present invention promises, flows of raw material gas may become imbalanced and the amount of generated ozone may decrease. A coefficient of thermal expansion of glass tubes which can be used for the present invention is therefore smaller than $10 \times 10^{-6}$ $K^{-1}$ approximately, and a heat-resistant strength with which a heat input will not cause remarkable deformation ("break") due to arc discharge is necessary.

TABLE 1

| | FILM THICKNESS (μm) | COEFFICIENT OF THERMAL EXPANTION ($K^{-1}$) | SELF-ELIMINATION EFFECT | CONDITION OF GLASS TUBE |
|---|---|---|---|---|
| GLASS TUBE A | 1.3 | $3.3 \times 10^{-6}$ | CONFIRMED | NO CRACK/BREAK |
| GLASS TUBE B | 1.4 | $5.0 \times 10^{-6}$ | CONFIRMED | NO CRACK/BREAK |
| GLASS TUBE C | 1.3 | $7.8 \times 10^{-6}$ | CONFIRMED | NO CRACK/BREAK |
| GLASS TUBE D | 1.4 | $9.1 \times 10^{-6}$ | CONFIRMED | NO CRACK/BREAK |
| GLASS TUBE E | 1.4 | $9.8 \times 10^{-6}$ | CONFIRMED | CRACK |
| GLASS TUBE F | 1.3 | $10.8 \times 10^{-6}$ | CONFIRMED | CRACK/BREAK |
| CERAMIC TUBE G | 1.5 | $5.0 \times 10^{-6}$ | CONFIRMED | NO CRACK/BREAK |
| CERAMIC TUBE H | 1.4 | $7.2 \times 10^{-6}$ | CONFIRMED | NO CRACK/BREAK |
| CERAMIC TUBE I | 1.5 | $11.5 \times 10^{-6}$ | CONFIRMED | CRACK/BREAK |

Such glass tubes include, amount those available from SCHOTT, "AR-Glas", "DURATAN", "DUROBAX", "SUPREMAX", "SURPRAX", "FIOLAX", "ILLAX", "8248", "8250", "8252", "8253", "8485" and the like for example, in addition to "DURAN".

The dielectric members used in the ozone generator 100 according to the present invention are not limited to glass tubes but may be ceramic tubes having Φ 30 mm or smaller, the thickness of 0.5 mm or thicker and the coefficient of thermal expansion of smaller than $10 \times 10^{-6}$ $K^{-1}$, like the ceramic tubes G and H included in Table 1. However, since a ceramic tube tends to crack while formed, the thickness is preferably 1.0 mm or thicker. When destroyed upon abnormality, such a ceramic tube gets partially destroyed in the shape of a trough hole as the glass tubes according to the present invention do. When the conductive thin film according to the present invention was disposed as high voltage electrodes for such ceramic tubes, the self-elimination effect of the high voltage electrodes was realized.

As described above, since the ozone generator 100 according to the present invention uses the hard glass tubes of φ 30 mm or smaller, the thickness of 0.5 mm or thicker, the $SiO_2$ content of 60% or higher or preferably 80% or higher and the coefficient of thermal expansion of smaller than $10 \times 10^{-6}$ $K^{-1}$, when destroyed upon abnormality, the glass tubes get partially destroyed in the shape of through holes but will not get "broken".

Further, for those glass tubes, a conductive thin film having the thickness of 0.05 through 100 μm, or preferably, 0.05 through 10 μm is disposed as the high voltage electrodes, and a high voltage is fed to the high voltage electrodes via the power feeding members from positions spaced apart at least 10 mm from the ends of the ground electrodes. Upon destruction of the glass tube, the high voltage electrode instantaneously senses a short-circuit current and eliminates itself while ensuring a creeping distance which is enough to stop dramatic arc discharge. Hence, it is possible to selectively stop discharge only at the destroyed section without using an expensive protection device such as a high voltage fuse and without short circuiting the ozone generator. Use of ceramics tubes of φ 30 mm or smaller, the thickness of 0.5 mm or thicker and the coefficient of thermal expansion of smaller than $10 \times 10^{-6}$ $K^{-1}$ also attained a similar effect to that obtained where the glass tubes are used.

To further note, it is possible to continue a safe operation only with the non-destroyed sections without almost any decrease of the amount of generated ozone, as discharge is stopped only at the destroyed section instead of completely severing the entire glass tube having the destroyed section from a drive power source as in a conventional ozone generator including high voltage fuses.

In addition, nonuse of high voltage fuses reduces a cost, mitigates an energy loss attributable to the high voltage fuses, and permits use of glass tubes having a small diameter, which makes it possible to reduce the size of the ozone generator.

Second Embodiment

According to the first embodiment, upon glass tube destruction, the high voltage electrode around the destroyed section eliminates itself as it exfoliates, evaporates or gets sublimated, thereby realizing an operation of protecting against short circuit without using high voltage fuses. It was confirmed that in the instance as that shown in FIG. 13 as well, that is, when the high voltage electrode around a destroyed section 18 got oxidized instead of eliminated, a similar operation of protecting against short circuit to that according to the first embodiment was realized.

Figure 13:
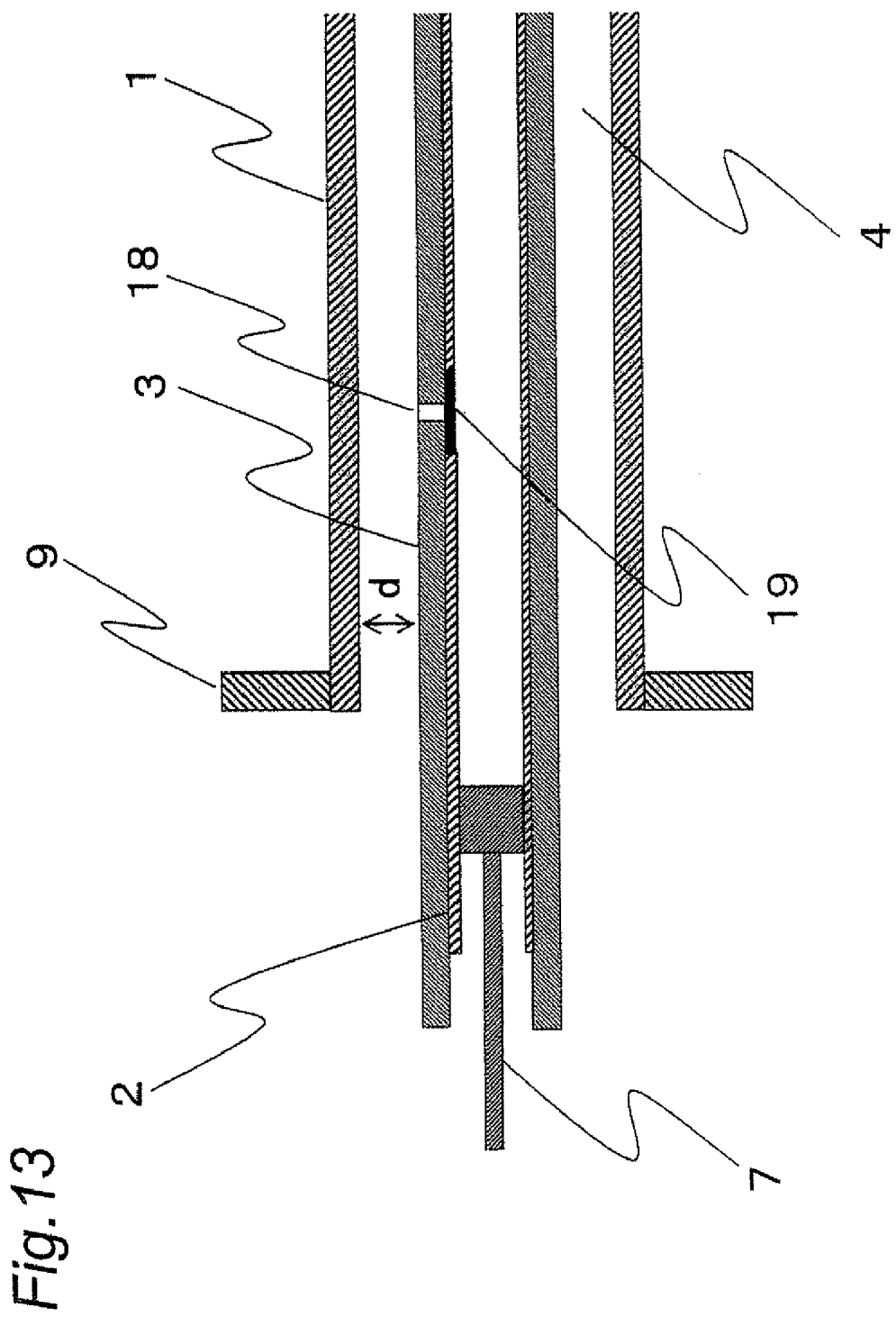
FIG. 13 is a partial cross sectional view of an ozone generator according to a second embodiment of the present invention.

FIG. 13 is a partial cross sectional view of an ozone generator according to the second embodiment. The sections denoted at the same reference symbols as those appearing in FIG. 1 are the same or corresponding sections. The high voltage electrode 2 is a conductive thin film which is formed in a similar manner to that according to the first embodiment, and in the illustrate condition, there is a through destruction in the destroyed section 18 of the glass tube 3. In this example, in the destroyed section 18, the high voltage electrode 2 does not exfoliate, evaporate or get sublimated but remains as an oxide layer 19 on the inner surface of the glass tube 3.

However, the electric resistance value of the oxide layer 19 is extremely higher than those of the other high voltage electrodes, and as it is still semi conductive instead of being perfectly insulating, it serves to relax an electric field. This ensures an effect that arc discharge is suppressed which develops between the ground electrode 1 and the high voltage electrode 2 via the destroyed section 18.

Supply of a high voltage is therefore selectively stopped only at the oxide layer 19 around the destroyed section 18, thereby realizing a similar effect to that obtained according to the first embodiment.

Whether a high voltage electrode gets eliminated or remains as an oxide layer upon glass tube destruction is considered to be attributable to the capacity of an ozone generator (the capacity of a drive power source), the value of a short-circuit current, etc. Where there is a relatively moderate thermal influence exerted by arc discharge or depending upon the material of high voltage electrodes, the high voltage electrodes do not get eliminated but stay as oxide layers, which enables continued ozone generation only with non-destroyed sections without short circuit and without almost any decrease of the amount of generated ozone. This permits the high voltage electrodes themselves to provide protection against short circuit caused by glass tube destruction, without using expensive high voltage fuses. Nonuse of high voltage fuses makes it possible to reduce a cost and mitigate an energy loss attributable to the high voltage fuses, and permitted use of glass tubes having a small diameter reduces the size of the ozone generator.

Third Embodiment

In the case of an ozone generator whose capacity is small or medium, i.e., an ozone generator which generates ozone in the amount of about 10 kg/h or less, upon glass tube destruction, the area in which a high voltage electrode eliminates itself is extremely narrow as described in relation to the first embodiment.

Figure 14:
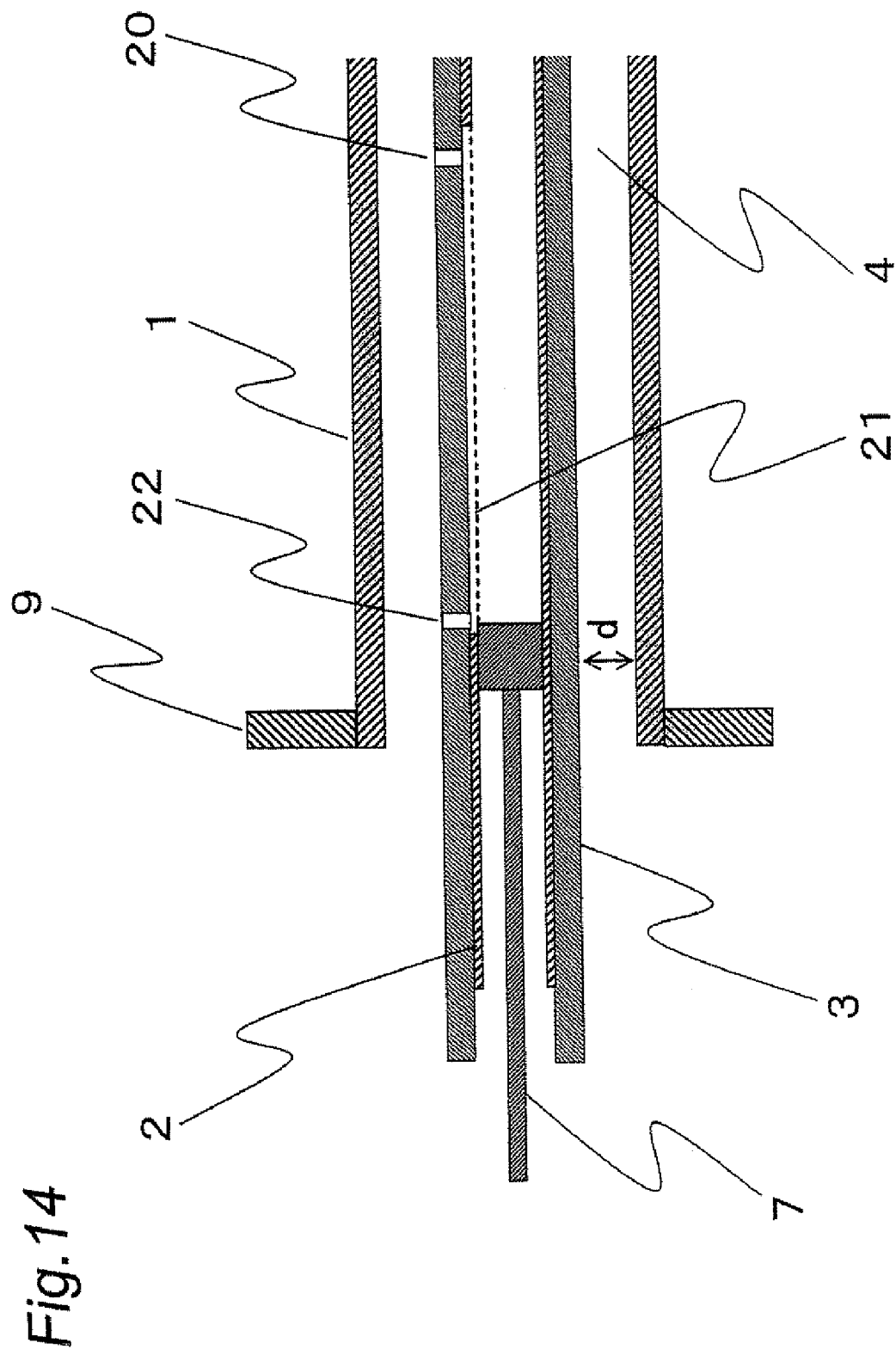
FIG. 14 is a partial cross sectional view of an ozone generator according to the second embodiment of the present invention.

However, in the event that a conductive thin film as that according to the first embodiment is disposed as high voltage electrodes in a large-capacity ozone generator which generates ozone in the amount of about 40 kg/h for instance, upon glass tube destruction, as shown in FIG. 14, a high voltage electrode in its entirety from the position at which the power feeding member 7 contacts the high voltage electrode 2 to an initially eliminated section 20 having the shape of a through hole of the glass tube 3 may get eliminated due to the thermal influence exerted by arc discharge (self-eliminated section 21).

Further, when a short-circuit current which instantaneously flows is about 100 A or larger, arc discharge may be created continuously between the power feeding member 7 and the ground electrode 1 via the destroyed section, and due to a heat input due to remarkable arc discharge between the end of the power feeding member 7 and the ground electrode 1 may eventually and thoroughly destroy the glass tube 3 (eventually destroyed section 22). In FIG. 14 however, the power feeding member 7 contacts the high voltage electrode 2 inside the ground electrode 1.

Figure 15:
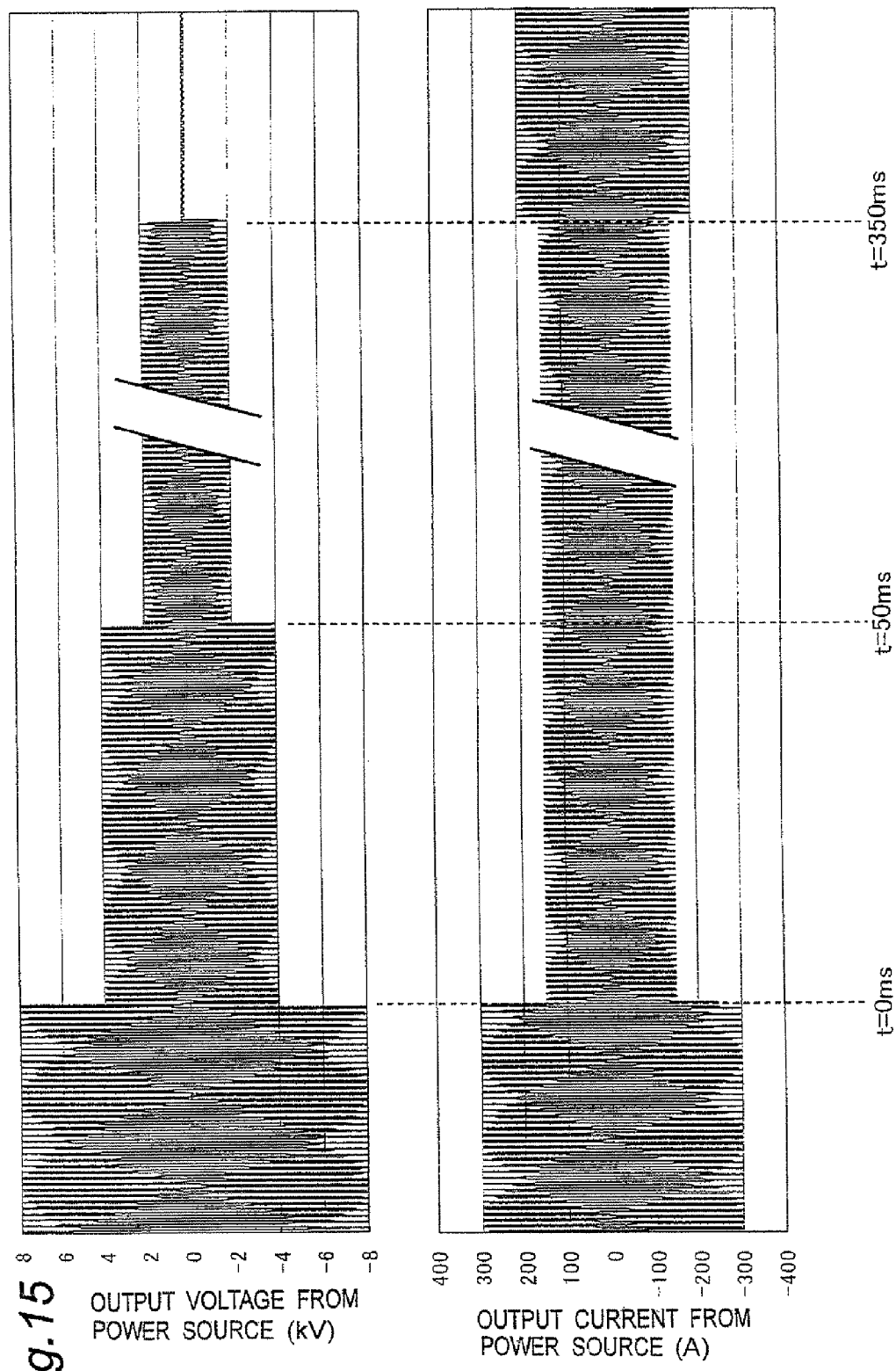
FIG. 15 shows an output voltage from a drive power source and the waveform of an output current upon destruction of the glass tube.

FIG. 15 shows an output voltage from a drive power source and the waveform of an output current upon such glass tube destruction described above in a large-capacity ozone generator which generates ozone in the amount of about 40 kg/h roughly. The moment that the initially eliminated section 20 is formed in the glass tube is time t=0 ms.

One can see in FIG. 15 that the moment the glass tube is destroyed, the output voltage drops down to about 4 kV from 8 kV and the output current drops down to about 150 A from 300 A.

Next, at t=50 ms, while the output voltage drops further down to about 2 kV from 4 kV, the output current stays around 150 A.

At around t=350 ms, the output voltage is almost 0 kV and the output current increases to about 200 A from 150 A.

Figure 16:
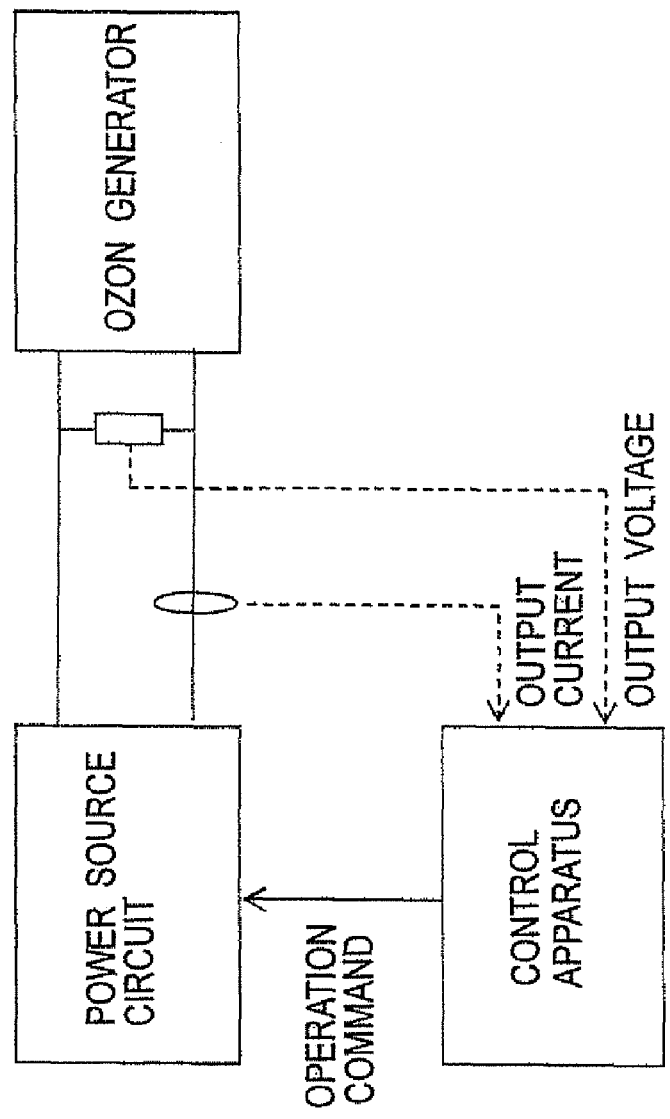
FIG. 16 shows a control apparatus which a third embodiment of the present invention uses.
Figure 17:
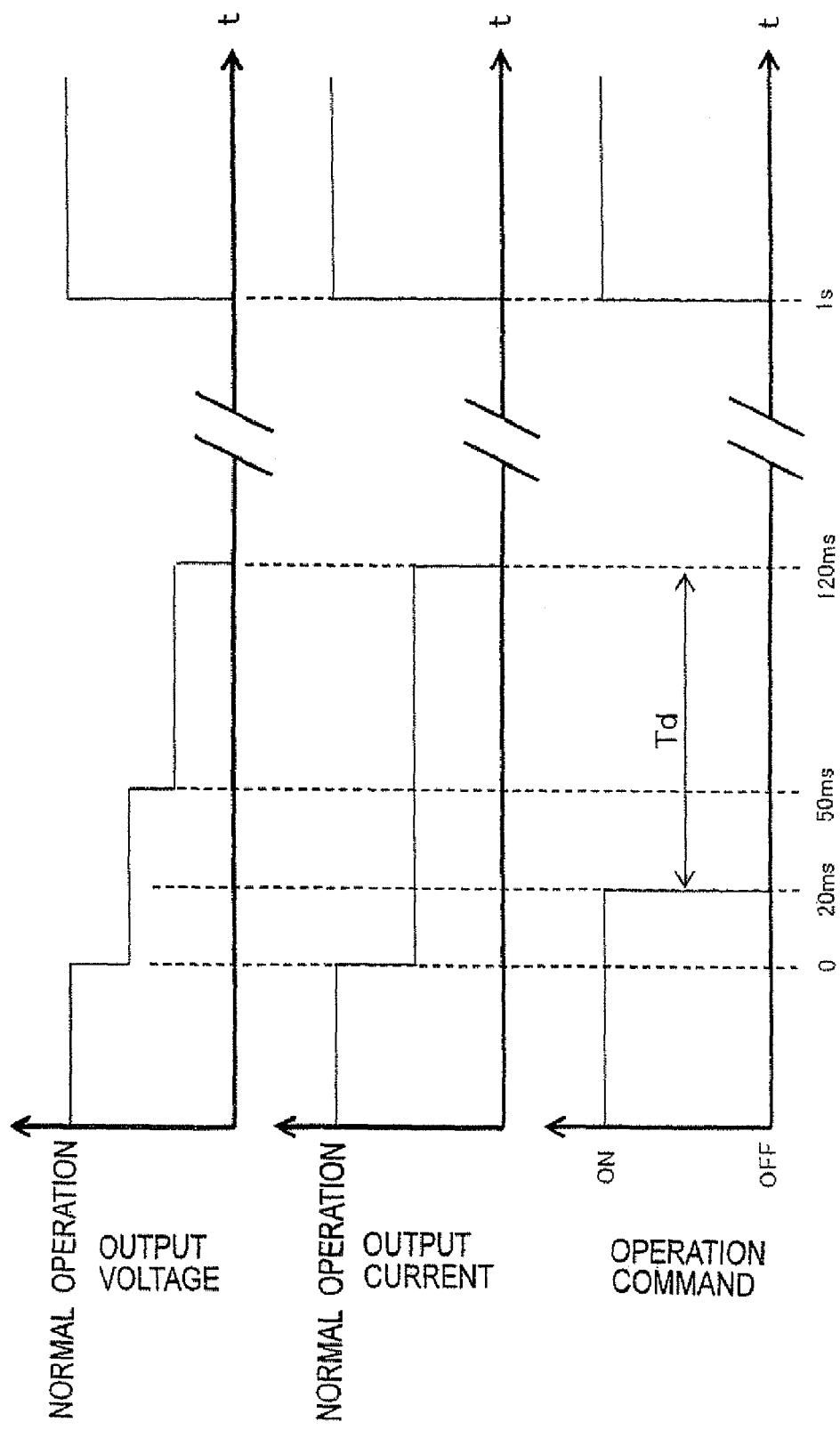
FIG. 17 shows a timing chart which the third embodiment of the present invention uses.

In short, this indicates that the period until 50 ms since destruction of the glass tube is a time period in which the high voltage electrode 2 eliminates itself and the self-eliminated section 21 is created, and that the temperature of the gas inside the glass tube 3 starts increasing gradually during this period. Since arc discharge develops continuously and the impedance on an electric circuit accordingly decreases at t=50 ms, the output voltage drops in a time zone after 50 ms, and at t=350 ms, the eventually destroyed section 22 is created, causing complete electric short circuit.

Where the high voltage electrodes according to the first embodiment is used for such a large-capacity ozone generator, a control apparatus shown in FIG. 16 may be used to thereby control the ozone generator and the drive power source in accordance with the timing chart shown in FIG. 17. In other words, use of such a control method prevents creation of an eventually destroyed section as that described above and eliminates the necessity of stopping the ozone generating equipment even despite glass tube destruction.

To be more specific, the control apparatus shown in FIG. 16 monitors the output voltage and the output current of the drive power source, and compares and detects against an output voltage and an output current which are obtained during a normal operation (i.e., when there is no glass tube destruction). As the difference from the output voltage value and the output current value obtained during the normal operation increases, the control apparatus sends an operation stop command to a power source circuit and stops the drive power source.

In the timing chart shown in FIG. 17, the initially eliminated section is formed at t=0 ms, the state that the output voltage and the output current are different from those during the normal operation is detected at t=20 ms, and the operation stop command is sent. In the power source circuit, the output voltage becomes zero after a time delay of Td=100 ms. While arc discharge develops in the destroyed glass tube at t=120 ms, since the duration of arc is not long, a temperature increase within the glass tube is small and will not lead to further destruction. Since the time until disappearance of plasma due to arc discharge is approximately 0.5 ms, the control circuit sends the operation stop command once again after 1 s, whereby a voltage is applied upon the ozone generator. Arc plasma has disappeared by this time, it is possible to apply the voltage normally upon the ozone generator and make the ozone generator resume its operation.

Where this control method is used, mere suspension of ozone generation for a short period of time makes it possible to resume ozone generation without exchanging or otherwise appropriately handling a glass tube. Suspension for a short period of time is not a practical problem at all as for plant equipment which uses a large-capacity ozone generator.

If the output voltage drops again despite application of the voltage upon the ozone generator after 1 s, the operation is stopped again and the ozone generator is stopped. Alternatively, the voltage may be applied after suspension for about 10 s. In the event that arc plasma disappears over a long time, the suspension time of about 10 s realize recovery of insulation. If the output voltage still drops despite the suspension time of 10 s, it is necessary to stop the ozone generator based on the recognition that there is some abnormality.

While the foregoing is directed to an example of secure detecting glass tube destruction based on monitoring of the output voltage and the output current from the drive power source, a similar effect is obtained by means of a control method which requires monitoring the output voltage alone or the output current alone, in which case it is possible to simplify the structure of the control apparatus at a low cost. Further, with a control method which requires monitoring the output power from the output voltage value and the output current value via a computing unit, a similar effect is attained.

Even if such control should fail, leading to glass tube destruction, as the power feeding member contacts the high voltage electrode at a position outside the ground electrode as in the first embodiment, short circuit does not occur between the power feeding member and the ground electrode. With arc plasma disappearing, insulation between the power feeding member and the ground electrode is recovered, which permits application of a high voltage upon the power feeding member.

Where such a control method is used for the glass tubes and the high voltage electrode according to the first embodiment, a large-capacity ozone generator in which a short-circuit current becomes about 100 A or beyond, it is possible to sense glass tube destruction securely without using high voltage fuses, it is not necessary to stop an entire plant where the large-capacity ozone generator is used, and it is possible to safely continue ozone generation again only by stopping ozone generation for an extremely short period of time.

Further, nonuse of high voltage fuses makes it possible to reduce a cost and mitigate an energy loss attributable to the high voltage fuses, and since it is possible to use glass tubes having a small diameter, the size of the ozone generator can be reduced.

Fourth Embodiment

In the case of an ozone generator whose capacity is small or medium as well, when the power density upon power-on is 0.5 W/cm$^2$ approximately which means large power upon power-on per unit discharge area, use of the high voltage electrode according to the first embodiment may lead to self-elimination over a wide area as in the third embodiment.

Figure 18:
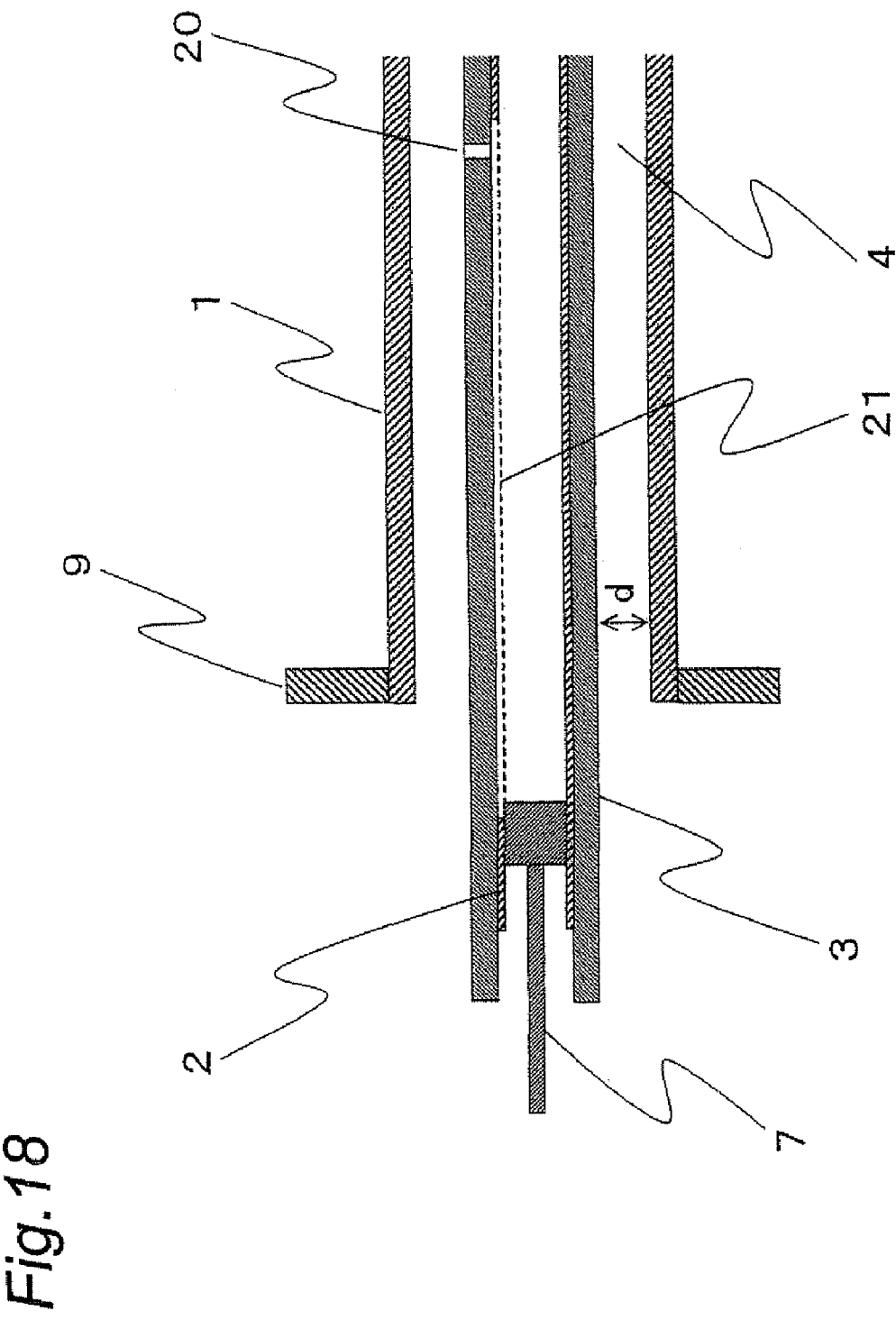
FIG. 18 is a partial cross sectional view of an ozone generator according to a fourth embodiment of the present invention.

As shown in FIG. 18, where a conductive thin film as that according to the first embodiment is disposed as high voltage electrodes and he power density upon power-on is 0.5 W/cm$^2$ approximately, as the power feeding members 7 are made contact the high voltage electrodes 2 from positions spaced apart at least 10 mm from the ends of the ground electrodes 1, a similar effect to that obtained according to the first embodiment is obtained despite glass tube destruction.

However, depending the situation, the high voltage electrode in its entirety from the position at which the power feeding member 7 contacts the high voltage electrode 2 to the destroyed section 20 having the shape of a through hole of the glass tube 3 may get eliminated due to the thermal influence exerted by arc discharge (The self-eliminated section 21 is denoted at the dotted line).

Hence, when the power density upon power-on is large, it is preferable that the control method according to the third embodiment is used to thereby stop ozone generation before the self-eliminated section reaches the power feeding member 7 and restart ozone generation after removing arc.

In the event that the power density upon power-on is 0.5 W/cm$^2$ or more in an ozone generator which uses the glass tubes and the high voltage electrodes according to the first embodiment, the control method according to the third embodiment may be used, which makes it possible to sense glass tube destruction securely without using high voltage fuses.

This eliminates the necessity of stopping an entire plant where the ozone generator is used, and it is possible to safely continue ozone generation again only by stopping ozone generation for an extremely short period of time.

Further, nonuse of high voltage fuses makes it possible to reduce a cost and mitigate an energy loss attributable to the high voltage fuses, and since it is possible to use glass tubes having a small diameter, the size of the ozone generator can be reduced.

Fifth Embodiment

Figure 19:
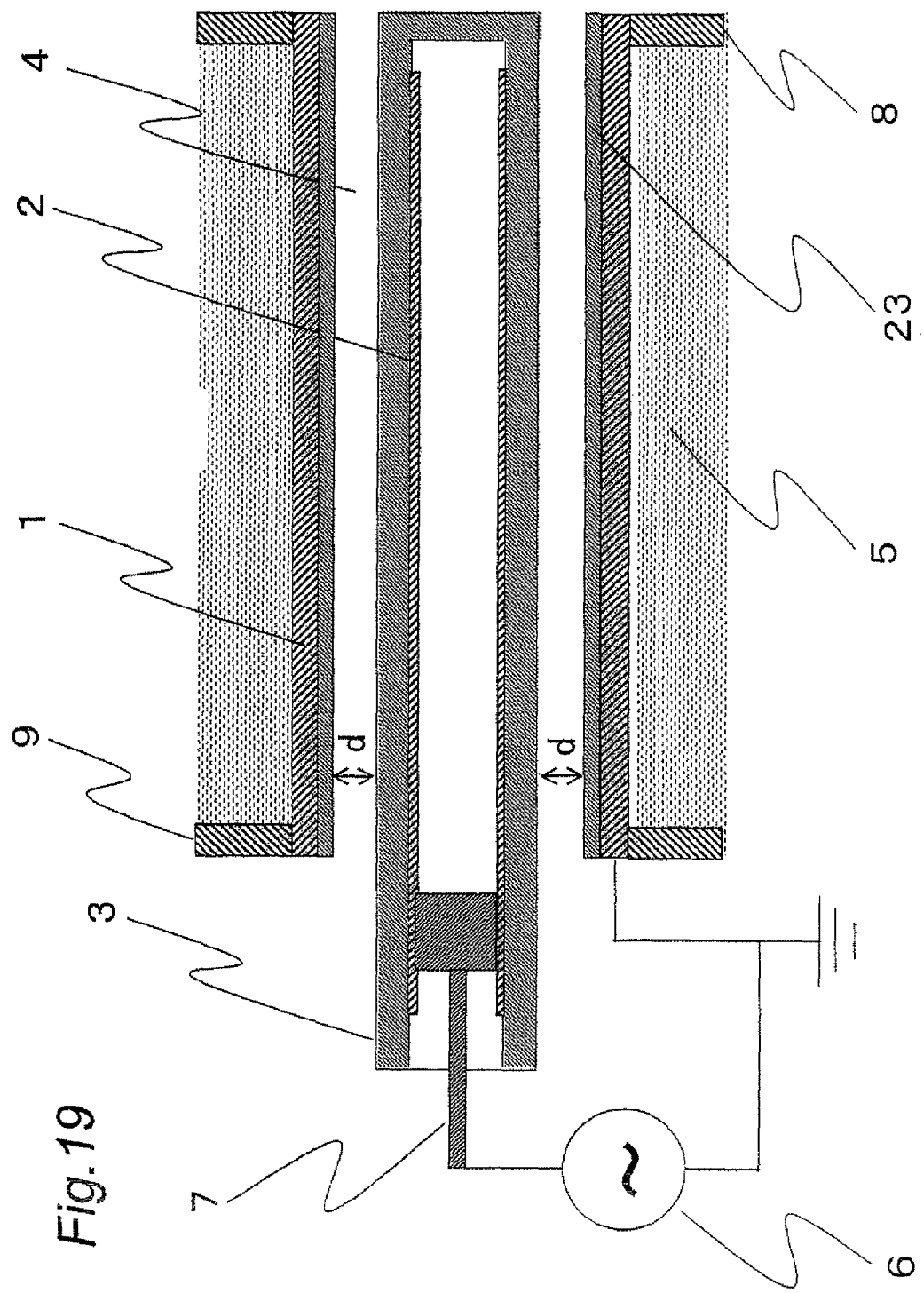
FIG. 19 is a partial cross sectional view of an ozone generator according to a fifth embodiment of the present invention.

FIG. 19 shows a structure that a dielectric member 23 is disposed on the ground electrode 1 in the ozone generator 100 according to the first embodiment, and in FIG. 19, the sections denoted at the same reference symbols as those appearing in FIG. 1 are the same or corresponding sections.

The dielectric member 23 can be obtained by thermal spraying a glass lining, enamel, ceramics or the like to the inner surface of the ground electrode 1 which is formed by a stainless steel tube. Alternatively, a glass tube of the same type as that of the dielectric member 3 but having a different diameter may be bonded to the ground electrode 1 as the dielectric member 23.

In such a structure as well, as in the ozone generator 100 according to the first embodiment, upon glass tube destruction, the high voltage electrode around the destroyed section eliminates itself or gets oxidized as it exfoliates, evaporates or gets sublimated, thereby suppressing arc discharge on its own. This realizes continued ozone generation only with non-destroyed sections without using high voltage fuses, without short circuit and without almost any decrease of the amount of generated ozone. Thus, nonuse of high voltage fuses makes it possible to reduce a cost and mitigate an energy loss attributable to the high voltage fuses, and since it is possible to use glass tubes having a small diameter, the size of the ozone generator can be reduced.

Sixth Embodiment

Figure 20:
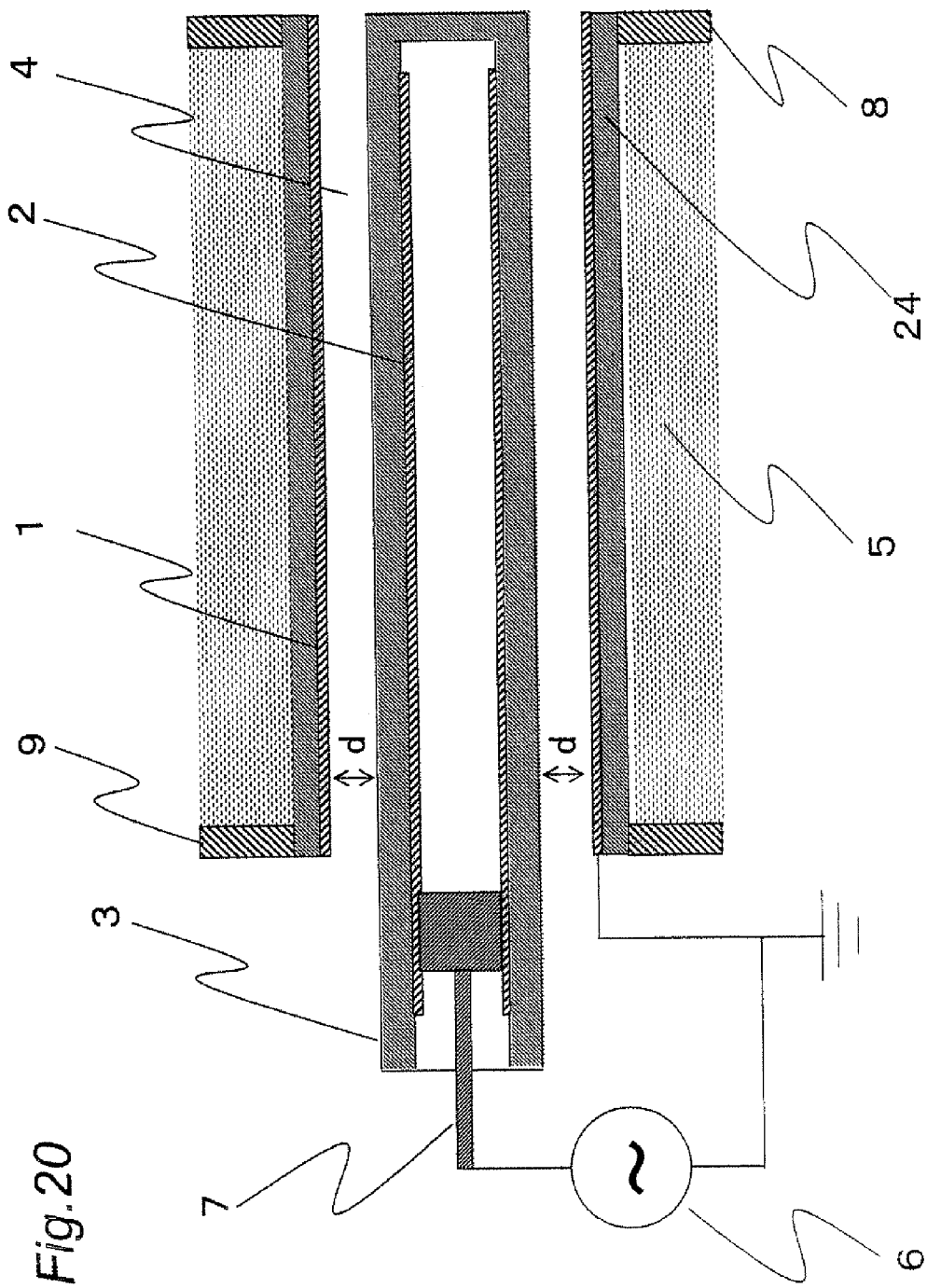
FIG. 20 is a partial cross sectional view of an ozone generator according to a sixth embodiment of the present invention.

FIG. 20 shows a structure that the ground electrode 1 of the ozone generator 100 according to the first embodiment is disposed on the inner surface of a dielectric member 24, and in FIG. 20, the sections denoted at the same reference symbols as those appearing in FIG. 1 are the same or corresponding sections.

The dielectric member 24 may be a glass tube or a ceramic tube. Like the high voltage electrode 2, the ground electrode 1 may be formed by electroless nickel plating and may accordingly have the film thickness of 0.05 through 100 µm on the inner surface of the dielectric member 24.

Use of such a structure provides the self-elimination effect to the ground electrode 1 as well. In short, upon destruction of the dielectric member 24, the ground electrode 1 around the destroyed section eliminates itself or gets oxidized as it exfoliates, evaporates or gets sublimated, thereby suppressing arc discharge on its own. This enhances the speed of short circuit detection and improves the reliability of electric disconnection from the destroyed section.

Where such a structure is used, upon glass tube destruction, the ground electrode as well around the destroyed section eliminates itself or gets oxidized as it evaporates or gets sublimated, and suppresses arc discharge.

This realizes continued ozone generation only with non-destroyed sections without using high voltage fuses, without short circuit and without almost any decrease of the amount of generated ozone. Thus, nonuse of high voltage fuses makes it possible to reduce a cost and mitigate an energy loss attributable to the high voltage fuses, and since it is possible to use glass tubes having a small diameter, the size of the ozone generator can be reduced.

Seventh Embodiment

The structure according to the present invention is applicable not only to a cylindrical multi-tube ozone generator as that according to the first embodiment but also to an ozone generator of the parallel plate type.

Figure 21:
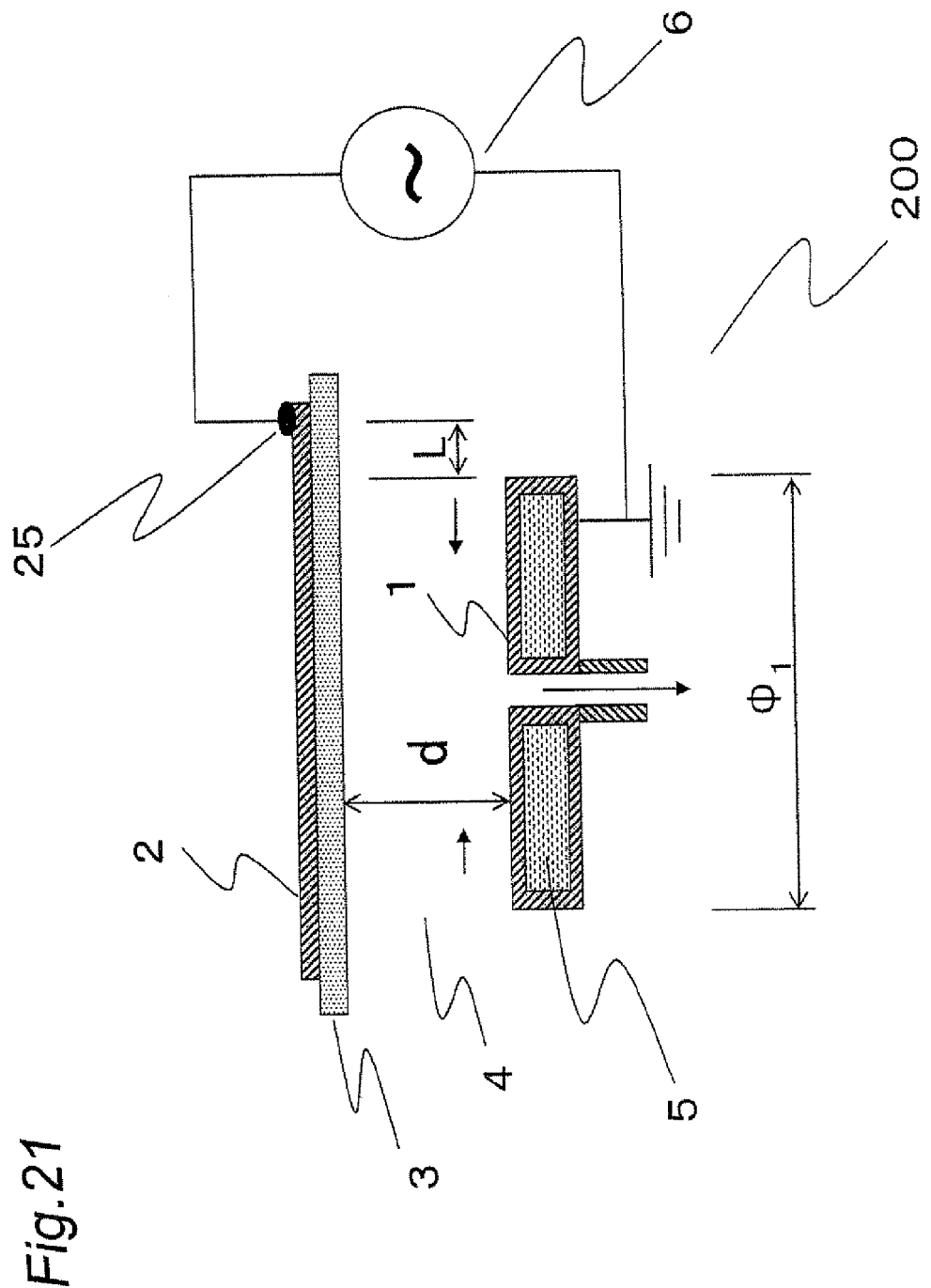
FIG. 21 is a cross sectional view of an ozone generator according to a seventh embodiment of the present invention.
Figure 22:
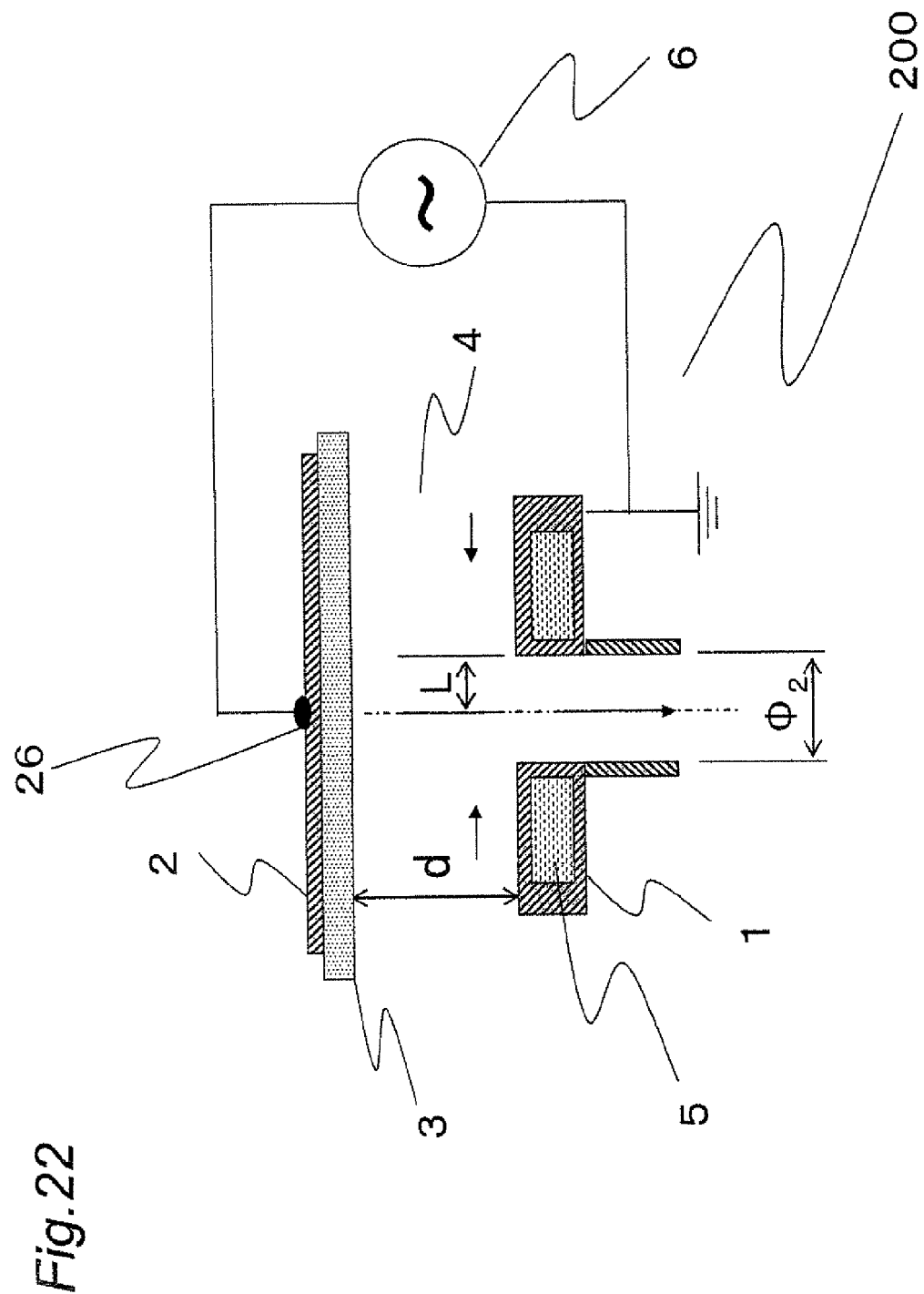
FIG. 22 is a cross sectional view of the ozone generator according to the seventh embodiment of the present invention.

FIGS. 21 and 22 are cross sectional views of an ozone generator of the parallel plate type generally denoted at 200 according to the seventh embodiment.

The ozone generator of the parallel plate type 200 includes the ground electrode 1 and the high voltage electrode 2 which are opposed against the ground electrode 1. There is the dielectric member 3 on the surface of the high voltage electrode 2, and the discharge space 4 is defined between the ground electrode 1 and the dielectric member 3. The high-frequency power source 6 is connected between the ground electrode 1 and the high voltage electrode 2. Where the plate-type electrode is shaped like a disk plate for instance, it is preferable that a high voltage is fed to a power feeding point 25 which is outside the outer diameter $\phi 1$ of the ground electrode 1 or a power feeding point 2 which is outside the inner diameter $\phi 2$ of the ground electrode 1 as in the first embodiment.

In FIGS. 21 and 22, the arrows denote the directions in which a gas flows, indicating that the gas flows from the outer circumference of the electrode toward a central part of the electrode. Of course, the power feeding points 25 and 26 need be spaced apart over the creeping distance L from the end of the high voltage electrode 2 in FIGS. 21 and 22.

In such a structure, upon destruction of the dielectric member 3, the high voltage electrode 2 around the destroyed section eliminates itself or gets oxidized as it exfoliates, evaporates or gets sublimated, thereby suppressing arc discharge. This realizes continued ozone generation only with non-destroyed sections without short circuit and without almost any decrease of the amount of generated ozone. Thus, nonuse of high voltage fuses makes it possible to reduce a cost and mitigate an energy loss attributable to the high voltage fuses.

Eighth Embodiment

The phenomenon described in relation to the first and the second embodiments is confirmed even when the high voltage electrodes 2 of the ozone generator 100 shown in FIG. 1 are mainly made of stainless steel, chromium, gold, silver, tin, zinc, copper, carbon or aluminum or when they are made of nickel or formed by a conductive compound mainly containing nickel as in the first and the second embodiments. That is, upon glass tube destruction, the high voltage electrode around the destroyed section eliminates itself or gets oxidized as it exfoliates, evaporates or gets sublimated, thereby suppressing arc discharge on its own. This realizes continued ozone generation only with non-destroyed sections without using high voltage fuses, without short circuit and without almost any decrease of the amount of generated ozone.

This was confirmed when a membrane of stainless steel, chromium, gold, silver, tin, zinc, copper, carbon or aluminum was formed by electroless or electrolytic plating, thermal spraying, vapor deposition, sputtering or coating on the inner surfaces of the glass tubes as in the first embodiment. As for carbon, carbon slurry made of super fine carbon particles may be applied upon the inner surfaces of the glass tubes. A membrane of A conductive compound containing one of these may also be formed by electroless or electrolytic plating, thermal spraying, vapor deposition, sputtering or coating in a similar fashion.

Ninth Embodiment

The surface temperature of the high voltage electrodes in the ozone generator according to the present invention is 100° C. approximately under the operating conditions that the discharge airspace length d is 0.6 mm and the discharge power density is 0.5 W/cm². The temperature abruptly increases further due to instantaneous arc discharge upon glass tube destruction. Hence, where metal whose melting point is from 150 to 200° C. approximately is used for the high voltage electrodes, the high voltage electrodes can eliminate themselves upon glass tube destruction regardless of the film thickness of the high voltage electrodes.

As described above, in the destroyed section where the temperature rapidly increases, the high voltage electrode melts and becomes incapable of maintaining its existence on the inner surface of the glass tube, and it becomes impossible to feed a high voltage only to the destroyed section. This realizes continued safe ozone generation only with non-destroyed sections without short circuit and without using high voltage fuses.

Metal such as indium and lithium is suitable as the material of the high voltage electrodes. When the operating conditions for the ozone generator are changed and the maximum value of the surface temperature of the high voltage electrodes accordingly changes, metal whose melting point is suitable to that maximum value may be selected the material of the electrodes.

Tenth Embodiment

The tenth embodiment of the present invention is directed to an application of silent discharge according to the present invention to a laser oscillator.

Figure 23:
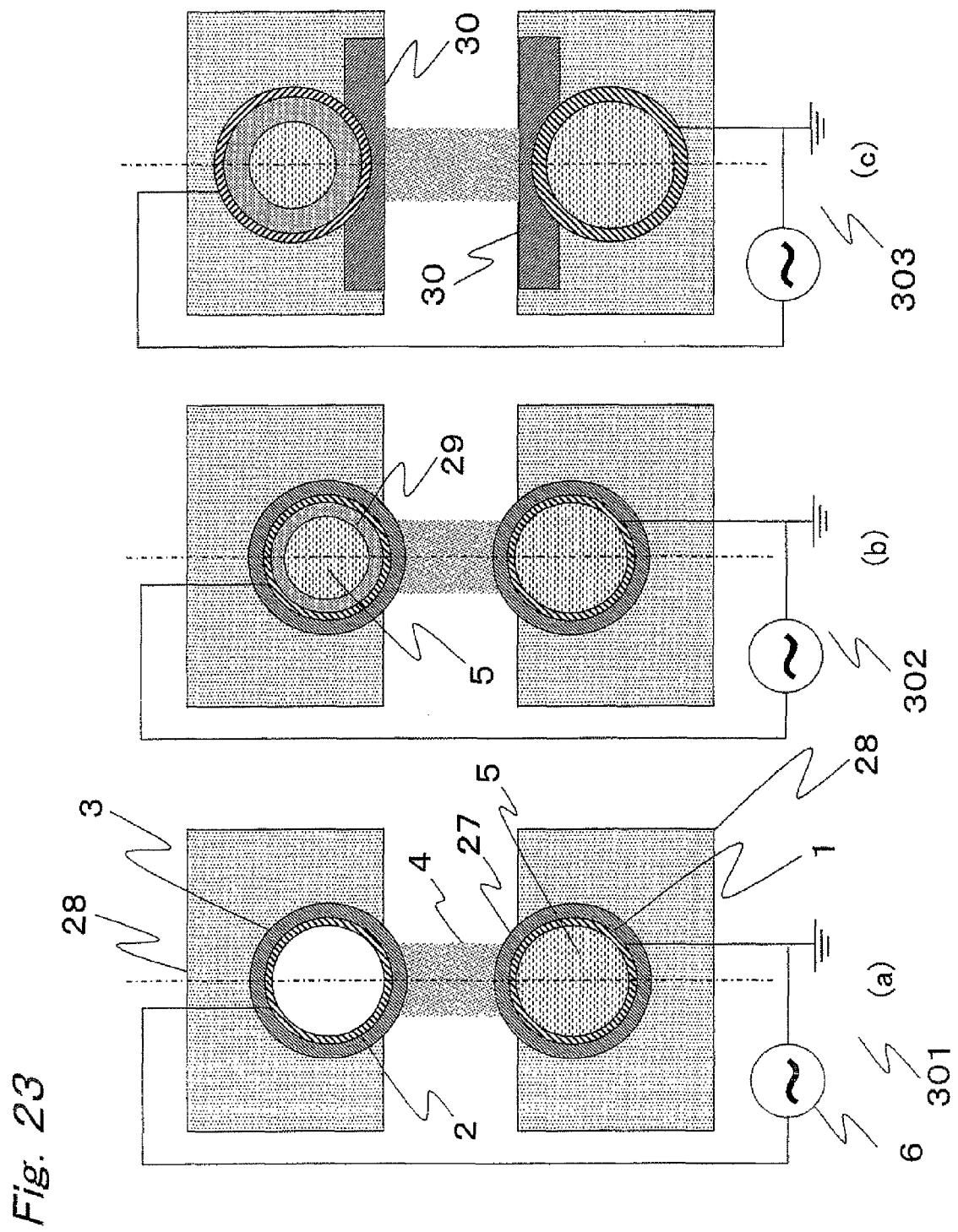
FIG. 23 is a cross sectional view of a laser oscillator according to a tenth embodiment of the present invention.

The sections (a) through (c) in FIG. 23 are cross sectional views of electrode structures of silent discharge $CO_2$ laser oscillators according to the tenth embodiment.

In the laser oscillator 301 shown in the section (a), the ground electrode 1 which is cylindrical and the high voltage electrode 2 disposed on the inner surface of the dielectric member 3 are disposed each inside an insulator 28, thereby defining the discharge space 4. The high voltage electrode 2 is formed by a conductive thin film as that according to the first embodiment. The cooling water path 5 is provided inside the ground electrode 1, and a dielectric member 27 is disposed at the periphery of the ground electrode 1. A laser gas containing carbon dioxide is introduced into the discharge space 4 for laser oscillation.

As a similar high voltage electrode 2 to that according to the first embodiment is disposed, upon destruction of the dielectric member, the high voltage electrode around the destroyed section senses a short-circuit current instantaneously and eliminates itself or gets oxidized, which selectively stops supply of power only to and around the destroyed section. This realizes continued laser oscillation only with non-destroyed sections without using high voltage fuses and without short circuit. Thus, nonuse of high voltage fuses makes it possible to reduce a cost and mitigate an energy loss attributable to the high voltage fuses.

In the laser oscillator 302 shown in the section (b), the high voltage electrode 2 is disposed on the inner surface of the dielectric member 3, and further, an insulator 29 and the cooling water path 5 are provided inside the same. Cooling water may be tap water, besides pure water or ion exchanged water. The insulator 29 insulates electric conduction owing to cooling water, and functions as an absorbent which absorbs the high voltage electrode 2 which evaporates or gets sublimated and accordingly eliminates itself upon abnormality. It is therefore preferable to choose an insulating material which is relatively porous, i.e., which has a large surface area size for the insulator 29. When the high voltage electrode 2 gets oxidized and supply of power is selectively stopped at and around a destroyed section, the insulator 29 serves only as an insulator against the cooling water.

In the laser oscillator 303 shown in the section (c), dielectric members 30 are disposed as flat plates, and the ground electrode 1 including the cooling water path 5 and the high voltage electrode 2, which is formed on the outer peripheral surfaces of the cooling water path S and the insulator 29, are disposed. This structure as well attains a similar effect to those realized by the laser oscillators 301 and 302.

In any one of the structures of the laser oscillators 301 through 303, since the power feeding point on the high voltage side is in a portion not facing the discharge space, the self-elimination effect of the high voltage electrode 2 is greater.

Eleventh Embodiment

The eleventh embodiment of the present invention is directed to an application of silent discharge according to the present invention to a hazardous gas decomposition apparatus.

Figure 24:
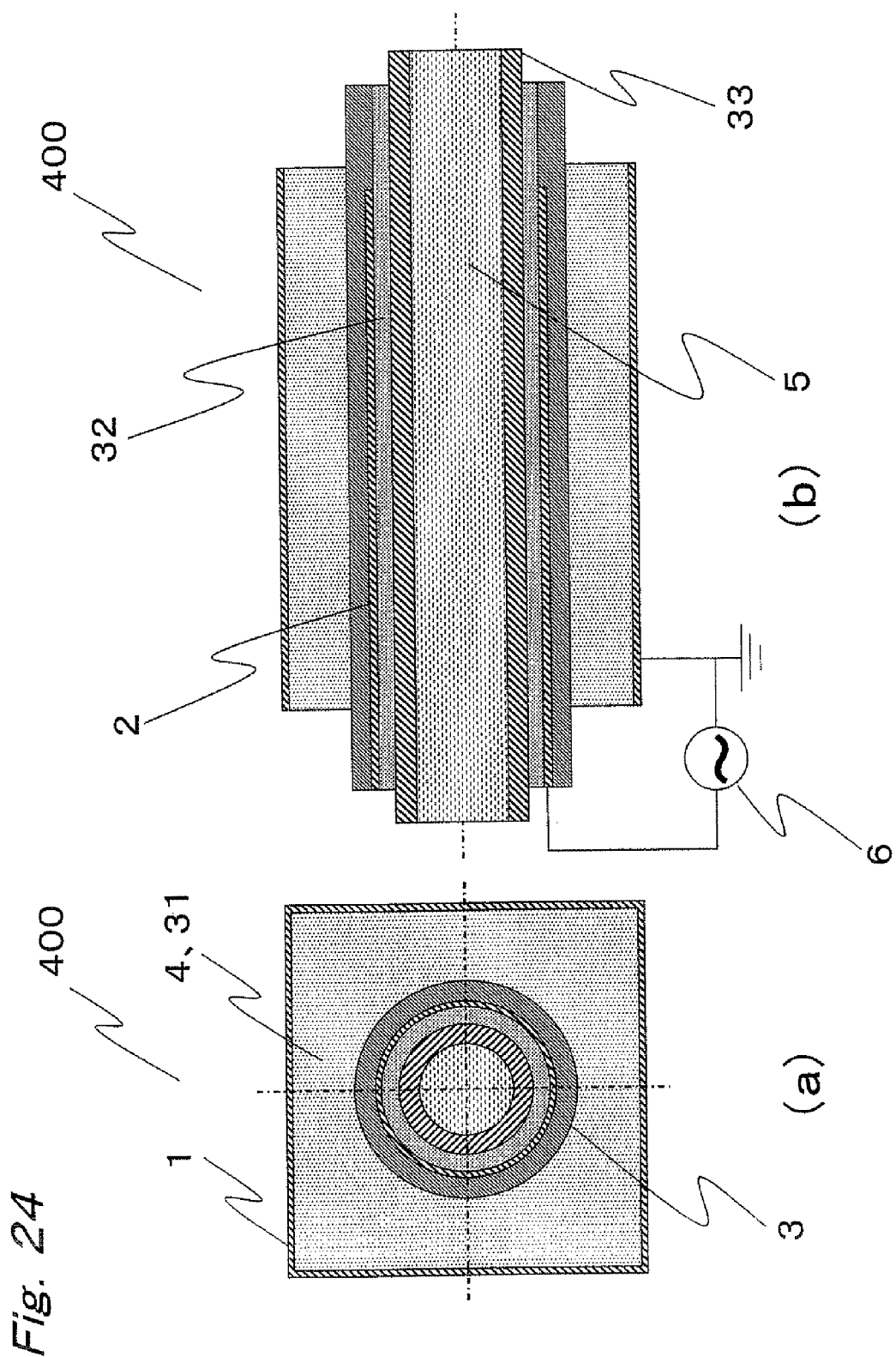
FIG. 24 is a cross sectional view of a hazardous gas decomposition apparatus according to an eleventh embodiment of the present invention.

FIG. 24 shows an electrode structure of a hazardous gas decomposition apparatus generally denoted at 400, and the section (a) is a horizontal cross sectional view while the section (b) is a vertical cross sectional view A hazardous gas in this context is a VOC (Volatile Organic Compounds) gas which is typically toluene and xylene, chlorofluorocarbon, PFC (Perfluoro Compounds), etc.

In the hazardous gas decomposition apparatus 400, an absorbent 31 is introduced into the discharge space 4 which is defined by the ground electrode 1, the high voltage electrode 2 and the dielectric member 3. Further, a metal tube 33 including the cooling water path 5 is formed inside the high voltage electrode 2 via an insulator 32. The high voltage electrode 2 is formed by a conductive thin film as that according to the first embodiment. A hazardous gas introduced into the discharge space 4 is absorbed and removed by the absorbent while at the same time getting decomposed by plasma. This attains removal of the hazardous gas extremely efficiently.

In the hazardous gas decomposition apparatus 400, upon destruction of the dielectric member, the high voltage electrode around the destroyed section senses a short-circuit current instantaneously and eliminates itself or gets oxidized, which selectively stops supply of power only to and around the destroyed section. This realizes continued decomposition of a hazardous gas only with non-destroyed sections without using high voltage fuses and without short circuit. Thus, nonuse of high voltage fuses makes it possible to reduce a cost and mitigate an energy loss attributable to the high voltage fuses, and since it is possible to use glass tubes having a small diameter, the size of the hazardous gas decomposition apparatus can be reduced.

As in the tenth embodiment, it is preferable to choose a material which is relatively porous for the insulator 32 so that it is possible to absorb the high voltage electrode 2 which evaporates or gets sublimated and accordingly eliminates itself upon abnormality.

Twelfth Embodiment

Figure 25:
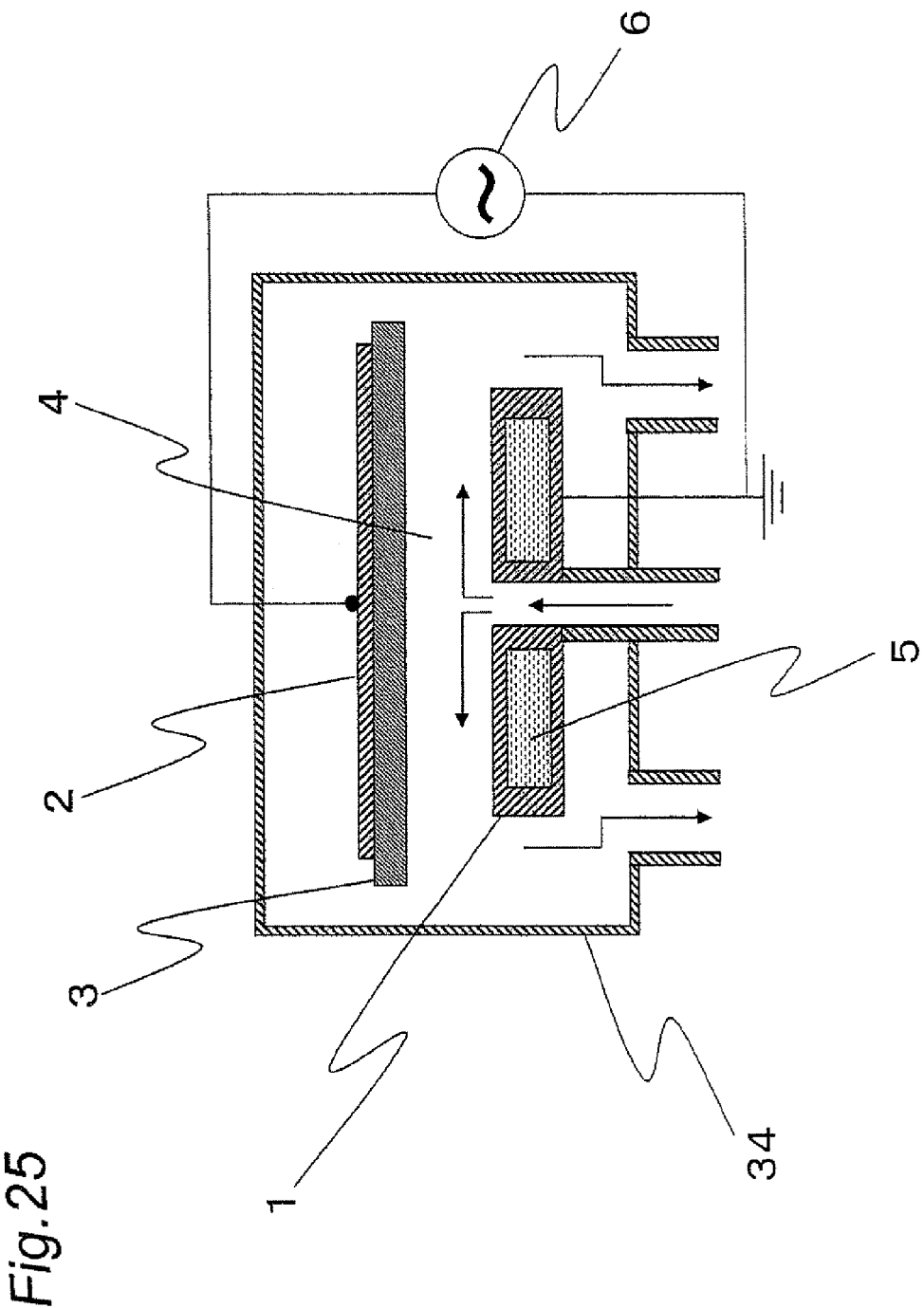
FIG. 25 is a cross sectional view of a semiconductor device manufacturing apparatus according to a twelfth embodiment of the present invention.
Figure 26:
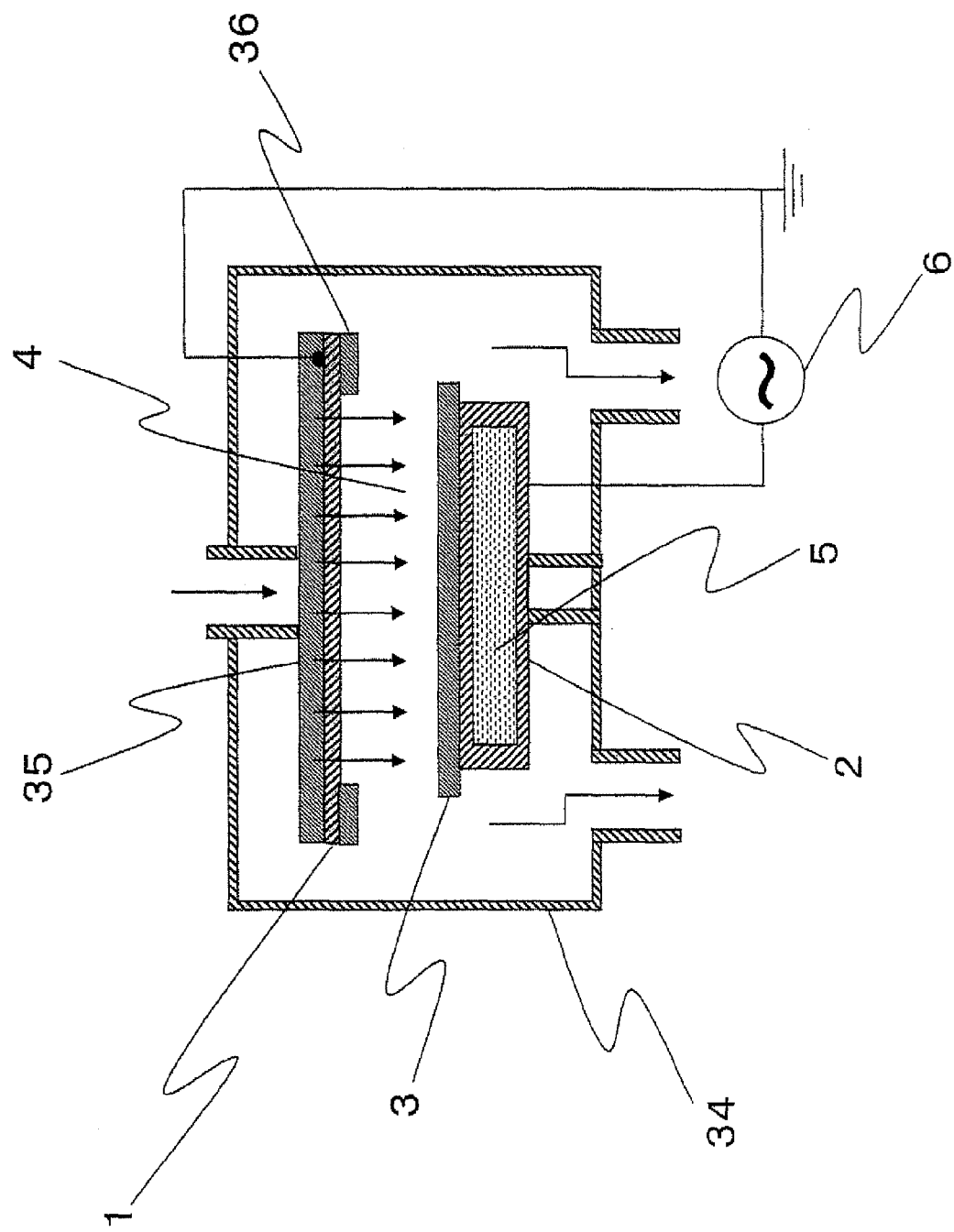
FIG. 26 is a cross sectional view of the semiconductor device manufacturing apparatus according to the twelfth embodiment of the present invention.

The eleventh embodiment of the present invention is directed to an application of silent discharge according to the present invention to a semiconductor device manufacturing process apparatus such as an RIE (Reactive Ion Etching) apparatus and a CVD (Chemical Vapor Deposition) apparatus. FIG. 25 is a cross sectional view of a CVD apparatus to which the present invention is applied, while FIG. 25 is a cross sectional view of an RIE apparatus to which the present invention is applied. In FIGS. 25 and 26, the sections denoted at the same reference symbols as those appearing in FIG. 1 are the same or corresponding sections.

In the CVD apparatus shown in FIG. 25 or the RYE apparatus shown in FIG. 26, upon destruction of the dielectric member 3, the high voltage electrode around the destroyed section senses a short-circuit current instantaneously and eliminates itself or gets oxidized, which selectively stops supply of power only to and around the destroyed section. This realizes continuation of an RIE or CVD process only with non-destroyed sections without using high voltage fuses and without short circuit. Thus, nonuse of high voltage fuses makes it possible to reduce a cost and mitigate an energy loss attributable to the high voltage fuses, and makes it unnecessary to stop the semiconductor device manufacturing apparatus or open to the atmosphere.

The power feeding point on the high voltage side is preferably located within a non-discharge section inside the ground electrode as described in relation to the seventh embodiment. The arrows in FIG. 25 denote the directions in which a gas flows, and a wafer to process is set on the ground electrode 1.

In FIG. 26, the directions in which a gas flows are different than in FIG. 25, and the raw material gas is introduced from an insulating shower head 35 in which numerous small holes are formed. In this structure, the conductive thin film according to the first embodiment is used as the ground electrode 1. A wafer to process is set on the dielectric member 3 which is formed on the high voltage electrode 2. An insulator 36 is a guard part which suppresses discharge. Of course, the high voltage electrode 2 is insulated from a plasma reactor container 34. This structure as well attains a similar effect to that realized by the CVD apparatus shown in FIG. 25.

The invention claimed is:

1. A silent discharge plasma apparatus comprising:
a dielectric member having a surface;
a pair of electrodes opposed to each other across said dielectric member; and
an alternating-current source electrically connected to said pair of electrodes, for applying an alternating-current voltage between said electrodes and for causing a discharge in a gas supplied to a discharge space where the discharge occurs, creating a plasma, wherein
at least one of said electrodes includes a conductive power feeding thin film on said dielectric member, and,
when said dielectric member is destroyed and an arc discharge develops between said pair of electrodes, said power feeding thin film is eliminated and the arc discharge is stopped.

2. The silent discharge plasma apparatus according to claim 1, wherein said power feeding thin film is a conductive thin film with a thickness from about 0.05 to about 100 µm.

3. The silent discharge plasma apparatus according to claim 1, wherein said dielectric member has a coefficient of thermal expansion smaller than $1 \times 10^{-5}$ K$^{-1}$.

4. The silent discharge plasma apparatus according to claim 1, wherein the surface of said dielectric member has a ten-point average surface roughness not exceeding about 15 µm.

5. The silent discharge plasma apparatus according to claim 1, wherein said power feeding thin film contains at least one material selected from the group consisting of stainless steel, chromium, gold, silver, tin, zinc, nickel, carbon, copper, and aluminum.

6. The silent discharge plasma apparatus according to claim 1, wherein said power feeding thin film is a plated layer electrolessly or electrolytically plated.

7. The silent discharge plasma apparatus according to claim 1, wherein said alternating-current source is connected to said power feeding thin film outside said discharge space over a creeping distance of at least 10 mm, approximately from an end of said electrode which is opposed to said power feeding thin film.

8. The silent discharge plasma apparatus according to claim 1, wherein said dielectric member is a glass tube having an outer diameter not exceeding about 30 mm and a thickness of at least 0.5 mm.

9. The silent discharge plasma apparatus according to claim 1, comprising a control circuit which monitors at least one of an output voltage and an output current from said alternating-current source, and stops said alternating-current source and the arc discharge for at least 0.5 second upon destruction of said dielectric member and when the arc discharge develops between said electrodes.

10. A silent discharge plasma apparatus comprising:
a dielectric member having a surface;
a pair of electrodes opposed to each other across said dielectric member; and
an alternating-current source electrically connected to said pair of electrodes for applying an alternating-current voltage between said electrodes and for causing a discharge in a gas supplied to a discharge space, where the discharge occurs, creating a plasma, wherein
at least one of said electrodes includes a conductive power feeding thin film on said dielectric member, and,
when said dielectric member is destroyed and an arc discharge develops between said pair of electrodes, said power feeding thin film is oxidized and the arc discharge is stopped.

11. The silent discharge plasma apparatus according to claim 10, wherein said power feeding thin film is a conductive thin film with a thickness from about 0.05 to about 100 μm.

12. The silent discharge plasma apparatus according to claim 10, wherein said dielectric member has a coefficient of thermal expansion smaller than $1 \times 10^{-5}$ $K^{-1}$.

13. The silent discharge plasma apparatus according to claim 10, wherein the surface of said dielectric member has a ten-point average surface roughness not exceeding about 15 μm.

14. The silent discharge plasma apparatus according to claim 10, wherein said power feeding thin film contains at least one material selected from the group consisting of stainless steel, chromium, gold, silver, tin, zinc, nickel, carbon, copper, and aluminum.

15. The silent discharge plasma apparatus according to claim 10, wherein said power feeding thin film is a plated layer electrolessly or electrolytically plated.

16. The silent discharge plasma apparatus according to claim 10, wherein said alternating-current source is connected to said power feeding thin film outside said discharge space over a creeping distance of at least 10 mm, approximately from an end of said electrode which is opposed to said power feeding thin film.

17. The silent discharge plasma apparatus according to claim 10, wherein said dielectric member is a glass tube having an outer diameter not exceeding about 30 mm and a thickness of at least 0.5 mm.

18. The silent discharge plasma apparatus according to claim 10, comprising a control circuit which monitors at least one of an output voltage and an output current from said alternating-current source, and stops said alternating-current source and the arc discharge for at least 0.5 second upon destruction of said dielectric member and when the arc discharge develops between said electrodes.

* * * * *